US012361912B2

(12) United States Patent
Ng et al.

(10) Patent No.: US 12,361,912 B2
(45) Date of Patent: Jul. 15, 2025

(54) ELECTRONIC DEVICE SUPPORTING MULTI-EDID READ OPERATION AND OPERATING METHOD

(71) Applicant: SAMSUNG ELECTRONICS CO., LTD., Suwon-si (KR)

(72) Inventors: Teck Sheng Ng, Suwon-si (KR); Seongin Kang, Suwon-si (KR); Bongchan Cho, Suwon-si (KR); Hyeongsu Choi, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 52 days.

(21) Appl. No.: 18/088,897

(22) Filed: Dec. 27, 2022

(65) Prior Publication Data

US 2024/0013747 A1 Jan. 11, 2024

(30) Foreign Application Priority Data

Jul. 7, 2022 (KR) ........................ 10-2022-0083817

(51) Int. Cl.
*G06F 13/00* (2006.01)
*G09G 5/00* (2006.01)

(52) U.S. Cl.
CPC ......... *G09G 5/006* (2013.01); *G09G 2370/04* (2013.01); *G09G 2370/047* (2013.01); *G09G 2370/12* (2013.01)

(58) Field of Classification Search
CPC ......... G06F 13/10; G06F 13/00; G09G 5/006; G09G 2370/04; G09G 2370/047; G09G 2370/012
USPC ........................................................... 710/10
See application file for complete search history.

(56) References Cited

U.S. PATENT DOCUMENTS 8,243,082 B1 * 8/2012 Wyatt ........................ G06T 1/20 345/502
8,253,860 B2 * 8/2012 Hsiao ..................... H04N 7/163 386/231
8,941,672 B1 * 1/2015 Jacoby .................... G06F 13/14 713/300
9,554,179 B2 * 1/2017 Kim ........................ G06F 13/42
10,319,336 B2 * 6/2019 Oh ........................... G09G 5/18
10,917,688 B2 * 2/2021 Seo ........................ H04N 21/63
(Continued)

FOREIGN PATENT DOCUMENTS

JP 2021150790 A 9/2021
WO 2021-230711 A1 11/2021

OTHER PUBLICATIONS

Extended European Search Report in European Appln. No. 23167091.0, mailed on Jun. 1, 2023, 9 pages.

*Primary Examiner* — Christopher B Shin
(74) *Attorney, Agent, or Firm* — Fish & Richardson P.C.

(57) ABSTRACT

An operating method for an electronic device that communicates with a source device through a high definition multimedia interface (HDMI), includes determining whether the source device supports a multi-extended display identification data (EDID) read operation through a display data channel (DDC) and sequentially transmitting an EDID set stored in a non-volatile memory to the source device using an EDID group corresponding to a size of a cache memory, as a transmission unit, based on a size of the EDID set and the size of the cache memory, when it is determined that the multi-EDID read operation is supported.

20 Claims, 19 Drawing Sheets

(56) References Cited

U.S. PATENT DOCUMENTS

| | | | | |
|---|---|---|---|---|
| 2004/0039927 | A1* | 2/2004 | Hazama | G09G 5/006 713/189 |
| 2007/0186015 | A1* | 8/2007 | Taft | G09G 5/006 710/16 |
| 2007/0222779 | A1* | 9/2007 | Fastert | G06T 1/00 345/418 |
| 2008/0307118 | A1* | 12/2008 | Tseng | G06F 3/1423 710/8 |
| 2015/0213776 | A1* | 7/2015 | Sharma | G09G 5/005 345/520 |
| 2020/0177857 | A1* | 6/2020 | Oh | H04N 5/57 |
| 2022/0394317 | A1* | 12/2022 | Jang | H04N 21/43635 |
| 2022/0417468 | A1* | 12/2022 | Nakahama | G09G 5/005 |
| 2023/0161701 | A1* | 5/2023 | Kim | G06F 12/0842 711/207 |
| 2023/0197031 | A1* | 6/2023 | Esaki | H04N 23/60 345/204 |
| 2023/0345069 | A1* | 10/2023 | Lu | H04N 21/4108 |

* cited by examiner

FIG. 4

| Bytes | Description |
|---|---|
| 0–19 | Header information |
| 20–24 | Basic display parameters |
| 25–34 | Chromaticity coordinates. |
| 35–37 | Established timing bitmap. Supported bitmap for (formerly) standard display modes. |
| 38–53 | Standard timing information. Up to 8 2–byte fields describing standard display modes. |
| 54–71 | Descriptor 1 |
| 72–89 | Descriptor 2 |
| 90–107 | Descriptor 3 |
| 108–125 | Descriptor 4 |
| 126 | Number of extensions to follow. 0 if no extensions. |
| 127 | Checksum. Sum of all 128 bytes should equal 0 (mod 256). |

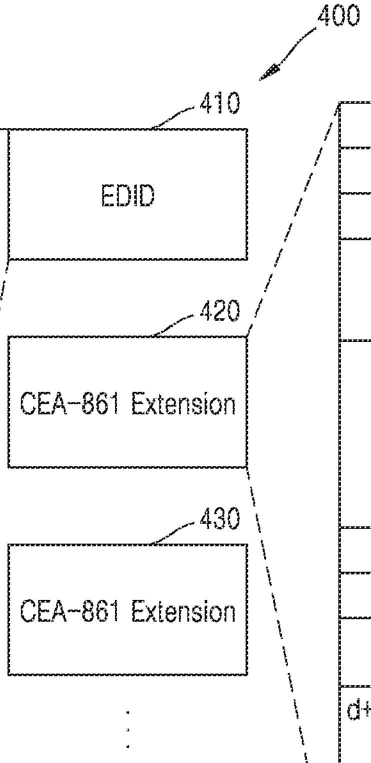

| Byte # | Value | Description |
|---|---|---|
| 0 | 0x02 | Tag (0x02) |
| 1 | 0x03 | Revision Number |
| 2 | | Byte number offset d where 18–byte descriptors begin (typically Detailed Timing Descriptors) |
| 3 | | Total number of Detailed Timing Descriptors describing native formats in entire E–EDID structures Also, indication of underscan support, audio support, and support of YCBCR is included |
| 4 | | Start of data block collection |
| d–1 | | End of data block collection |
| d | | Start of 18–byte detailed timing descriptors |
| d+(18*n)–1 | | End of 18–byte detailed timing descriptors where n is the number of descriptors included |
| d+(18*n) | 0x00 | Beginning of Padding |
| 126 | 0x00 | End of Padding |
| 127 | | Checksum |

FIG. 6

| Byte / Bits # | 7 | 6 | 5 | 4 | 3 | 2 | 1 | 0 |
|---|---|---|---|---|---|---|---|---|
| 0 | Vendor Specific Tag code (=3) | | | Length (=N) | | | | |
| 1 | IEEE OUI, Third Octet (0xD8) | | | | | | | |
| 2 | IEEE OUI, Second Octet (0x5D) | | | | | | | |
| 3 | IEEE OUI, First Octet (0xC4) | | | | | | | |
| 4 | Version (=1) | | | | | | | |
| 5 | Max_TMDS_Character_Rate | | | | | | | |
| 6 | SCDC_ Present | RR_ Capable | Rsvd (0) | Rsvd (0) | LTE_340Mcs c_scramble | Incipendent _view | Dual _view | 3D_OSD _Disparity |
| 7 | Rsvd (0) | Rsvd (0) | Rsvd (0) | Rsvd (0) | Rsvd (0) | DC_48bit _420 | DC_36bit _420 | DC_30bit _420 |
| …N | Reserved (0) | | | | | | | |

FIG. 7A

| Offset | R/W | Name |
|---|---|---|
| 0x01 | R | Sink version |
| 0x02 | R/W | Source version |
| 0x03 | R/W | IS_Sink_Support |
| 0x04 | R/W | IS_Source_Support |
| 0x05 | R/W | IS_EDID_Ready |
| 0x06 | R/W | IS_EDID_Finish |
| 0x10 | R/W | Update_0 |
| 0x11 | R/W | Update_1 |
| ⋮ | | |
| 0x56 | R | Err_Det_Checksum |
| 0x57 | R | Reserved |
| 0x58 | R | Reserved |
| 0x59 | R | Reserved |
| 0x5A | R | Reserved |
| ⋮ | | |
| 0xDE | R/W | Manufacturer Specific |
| 0xDF | R/W | Manufacturer Specific |
| 0xE0 | R/W | Manufacturer Specific |
| 0xE1 | R/W | Manufacturer Specific |
| 0xE2~FF | R/W | Manufacturer Specific |
| All Remaining Offsets | R | Reserved |

FIG. 7B

| Offset | R/W | Name |
|---|---|---|
| 0x01 | R | Sink version |
| 0x02 | R/W | Source version |
| 0x03 | R | Reserved |
| 0x04 | R | Reserved |
| 0x05 | R | Reserved |
| 0x06 | R | Reserved |
| 0x10 | R/W | Update_0 |
| 0x11 | R/W | Update_1 |
| | ⋮ | |
| 0x56 | R | Err_Det_Checksum |
| 0x57 | R/W | IS_Sink_Support |
| 0x58 | R/W | IS_Source_Support |
| 0x59 | R/W | IS_EDID_Ready |
| 0x5A | R/W | IS_EDID_Finish |
| | ⋮ | |
| 0xDE | R/W | Manufacturer Specific |
| 0xDF | R/W | Manufacturer Specific |
| 0xE0 | R/W | Manufacturer Specific |
| 0xE1 | R/W | Manufacturer Specific |
| 0xE2~FF | R/W | Manufacturer Specific |
| All Remaining Offsets | R | Reserved |

FIG. 7C

| Offset | R/W | Name |
|---|---|---|
| 0x01 | R | Sink version |
| 0x02 | R/W | Source version |
| 0x03 | R | Reserved |
| 0x04 | R | Reserved |
| 0x05 | R | Reserved |
| 0x06 | R | Reserved |
| 0x10 | R/W | Update_0 |
| 0x11 | R/W | Update_1 |
| | ⋮ | |
| 0x56 | R | Err_Det_Checksum |
| 0x57 | R | Reserved |
| 0x58 | R | Reserved |
| 0x59 | R | Reserved |
| 0x5A | R | Reserved |
| | ⋮ | |
| 0xDE | R/W | IS_Sink_Support |
| 0xDF | R/W | IS_Source_Support |
| 0xE0 | R/W | IS_EDID_Ready |
| 0xE1 | R/W | IS_EDID_Finish |
| 0xE2~FF | R/W | Manufacturer Specific |
| All Remaining Offsets | R | Reserved |

FIG. 10

[ Source ID ]

| Offset | Bit 7 | Bit 6 | Bit 5 | Bit 4 | Bit 3 | Bit 2 | Bit 1 | Bit 0 |
|---|---|---|---|---|---|---|---|---|
| 0x00 | Rsvd_n(1) | Rsvd_n(1) | Rsvd_n(1) | Rsvd_n(1) | Rsvd_n(1) | IS_EDID_READ_DONE | IS_SOURCE_SUPPORT | SI_PCA_n |

FIG. 11

[ Sink ID ]

| Offset | Bit 7 | Bit 6 | Bit 5 | Bit 4 | Bit 3 | Bit 2 | Bit 1 | Bit 0 |
|---|---|---|---|---|---|---|---|---|
| 0x00 | Reserved | Reserved | Reserved | Reserved | Reserved | IS_EDID_FINISH | IS_EDID_READY | IS_SINK_SUPPORT |

ELECTRONIC DEVICE SUPPORTING MULTI-EDID READ OPERATION AND OPERATING METHOD

CROSS-REFERENCE TO RELATED APPLICATION

This application claims priority under 35 U.S.C. § 119 to Korean Patent Application No. 10-2022-0083817 filed on Jul. 7, 2022 in the Korean Intellectual Property Office, the subject matter of which is hereby incorporated by reference in its entirety.

BACKGROUND

The inventive concept relates generally to electronic devices. More particularly, the inventive concept relates to electronic devices supporting a multi-extended display identification data (multi-EDID) read operation, as well as operating methods for same.

As content associated with ultra-high definition (HD)-class resolution (e.g., resolution beyond full HD resolution) has become more prevalent, sink devices and source devices have increasingly been equipped to support high definition multimedia interface (HDMI) version 2.1a. For example, in order to support emerging operating modes (e.g., gaming modes and high performance modes), sink devices should support a variety of resolutions.

In order for a sink device to support various capabilities associated with high resolution, a greater quantity of EDID may be associated with the sink device. Accordingly, as the size of EDID increases, storage space provided (e.g.,) by a cache memory of the sink device must be increased so that the source device may read all EDID and communicate content data using an appropriate resolution. Unfortunately, enlarging storage space drives up manufacturing costs and negatively impacts compatibility between various sink device(s) and source device(s). As a result, there is a need for source device related technology capable of efficiently and fully reading various types of EDID from various sink devices.

SUMMARY

Embodiments of the inventive concept provide electronic devices supporting the performance of multi-EDID read operations without necessarily increasing storage space associated with a constituent device. Other embodiments of the inventive concept provide operating methods for such electronic devices.

According to an aspect of the inventive concept, there is provided an operating method for a high definition multimedia interface (HDMI) system including a source device and a sink device including a non-volatile memory and a cache memory. The method includes; determining whether the source device supports a multi-extended display identification data (Multi-EDID) read operation through a display data channel (DDC), and upon determining that the source device supports the multi-EDID read operation, sequentially transmitting an EDID set stored in the non-volatile memory to the source device in accordance with an EDID group defined by a size of the cache memory.

According to an aspect of the inventive concept, there is provided an electronic device that communicates with a source device through a high definition multimedia interface (HDMI). The electronic device includes; a non-volatile memory configured to store an extended display identification data (EDID) set, a cache memory configured to temporarily store an EDID group selected from among the EDID set, and a processor configured to determine whether the source device supports a multi-EDID read operation through a display data channel (DDC), upon determining that the source device supports a multi-EDID read operation, compare a size of the EDID set with a size of the cache memory, upon determining that the size of the EDID set is greater than the size of the cache memory, select the EDID group from the EDID set in accordance with a transmission size corresponding to the size of the cache memory, load the EDID group into the cache memory, and transmit the loaded EDID group to the source device through a display data channel (DDC).

According to an aspect of the inventive concept, there is provided an electronic device that communicates with a source device through a high definition multimedia interface (HDMI). The electronic device includes; a non-volatile memory configured to store an extended display identification data (EDID) set, and a system-on-chip (SOC) including a processor and a cache memory, wherein the processor is configured to determine whether the source device supports a multi-EDID read operation through a display data channel (DDC), and upon determining that the source device supports the multi-EDID read operation, sequentially transmit an EDID group selected from among the EDID set in accordance with a transmission size defined by a size of the cache memory through the DDC.

According to an aspect of the inventive concept, there is provided an operating method for a high definition multimedia interface (HDMI) system including a source device and a sink device including a non-volatile memory storing an extended display identification data (EDID) set and a cache memory. The method includes; transmitting a hot plug detect signal from the sink device to the source device upon electrical connection between the sink device and the source device, determining whether the source device supports a multi-extended display identification data (multi-EDID) read operation through a display data channel (DDC), if the source device supports the multi-EDID read operation, sequentially transmitting the EDID set to the source device using at least two EDID groups selected from the EDID set in accordance with a transmission unit defined by a size of the cache memory, else if the source device does not support the multi-EDID read operation, transmitting the EDID set to the source device using a legacy EDID read operation.

BRIEF DESCRIPTION OF THE DRAWINGS

Advantages, benefits and features, as well as the making and use of the inventive concept may be more clearly understood upon consideration of the following detailed description together with the accompanying drawings in which:

FIG. 4 is a block diagram illustrating an multi-extended display identification data (multi-EDID) set according to embodiments of the inventive concept;

FIG. 6 is a table listing an HDMI forum (HF)-vendor-specific data block (VSDB) according to embodiments of the inventive concept;

FIGS. 7A, 7B, and 7C are respective tables illustrating an exemplary status and control data channel structure (SCDCS) according to embodiments of the inventive concept;

FIG. 10 is a conceptual diagram illustrating a source ID of an ID communications channel (IDCC) according to embodiments of the inventive concept;

FIG. 11 is a conceptual diagram illustrating a sink ID of an IDCC according to embodiments of the inventive concept;

DETAILED DESCRIPTION

Throughout the written description and drawings like reference numbers and labels are used to denote like or similar elements, components, features and/or method steps.

Figure 1:
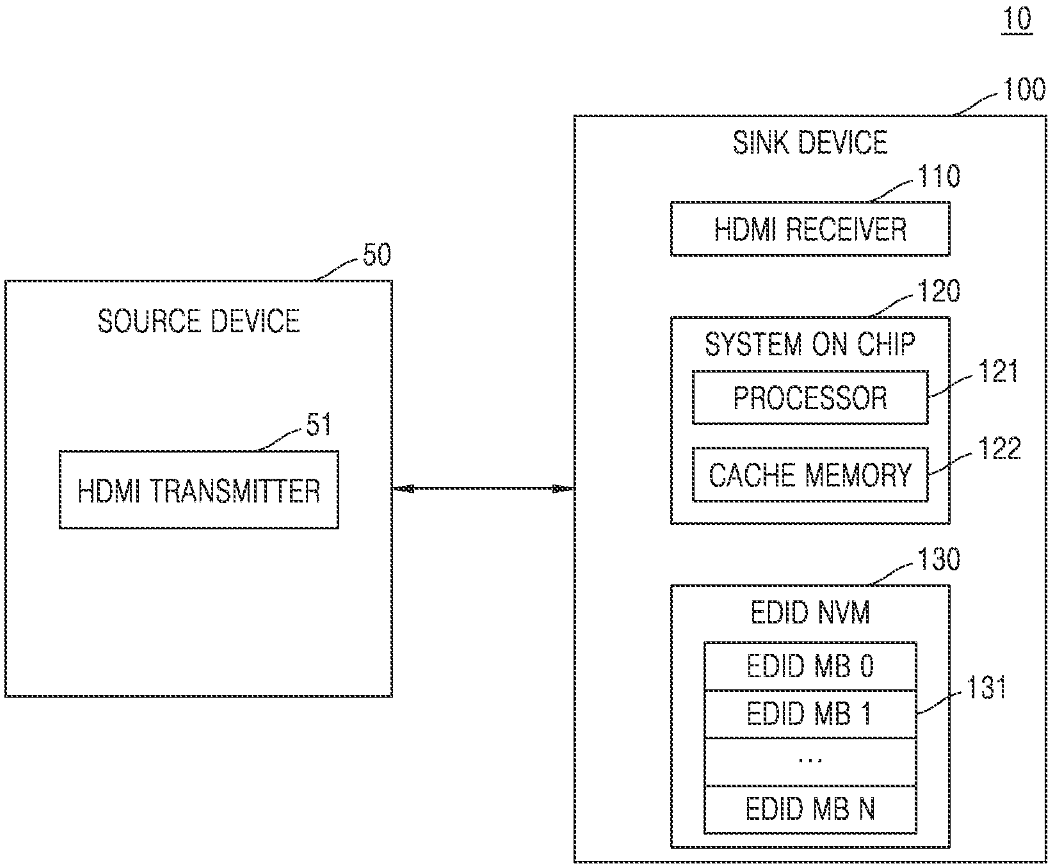
FIG. 1 is a block diagram illustrating a high definition multimedia interface (HDMI) system according to embodiments of the inventive concept.

FIG. 1 is a block diagram illustrating a high definition multimedia interface (HDMI) system 10 according to embodiments of the inventive concept.

Referring to FIG. 1, the HDMI system 10 may generally include a source device 50 and a sink device 100.

The source device 50 may be an electronic device that internally generates content data or receives content data from an external source. The source device 50 may be implemented in various forms, such as an optical media playback device, such as a digital video disc (DVD) or Blu-ray disc player, an ultra-high definition (UHD) player, a set-top box, a TV, a computer body, a mobile device, a game machine device, and a content server. Content data may include, for example, video data and/or audio data. In this regard, content data may be referred to as a content signal, video data may be referred to as a video signal, and audio data may be referred to as an audio signal.

The source device 50 may output the content signal in an output format corresponding to EDID of the sink device 100. Here, EDID may include, for example, characteristic information of the electronic device, device information, supportable resolution, image format, transmission interface standard, timing information, audio type, color information and capability information.

The source device 50 may include an HDMI transmitter 51 serving as a communication interface. For example, the HDMI transmitter 51 may be used to transmit a content signal to the sink device 100. In some embodiments, the HDMI transmitter 51 may transmit a content signal in accordance with an established HDMI transmission standard. For example HDMI transmission standard(s) have been released through version 2.1a. Here, HDMI 2.1a may be understood as a transmission standard capable of transmitting a content signal having a higher resolution than that of previous HDMI versions (e.g., HDMI versions 1, 1.1, 1.2-1.2a, 1.3-1.3a, 1.4-1.4b, 2.0-2.0b and 2.0). For example, HDMI 2.1a may be used to transmit a content signal associated with an 8K-class resolution. It follows that in order for the sink device 100 to display an 8K-class image, both the source device 50 and the sink device 100 must support HDMI 2.1a.

Although not shown in FIG. 1, the source device 50 may further include a user input module capable of manipulation by a user, a memory storing data, a processor capable of processing data, a communicator transmitting/receiving data, etc.

The sink device 100 may be an electronic device capable of processing and reproducing content data received from the source device 50. Here, the term "reproducing" denotes the displaying an image in response to processed video data and/or outputting audio in response to processed audio data. The sink device 100 may be implemented in various forms, such as a television (TV), a monitor, a portable multimedia player, a mobile phone, a personal computer (PC), a tablet PC, an electronic picture frame, an electronic blackboard, an electronic billboard, etc.

The sink device 100 may be an electronic device capable of communicating with the source device 50 using HDMI. In some embodiments, the sink device 100 may support one or more multi-EDID read operations. Here, a multi-EDID read operation may include operation of the sink device 100 in transmitting at least one EDID such that the source device 50 may read an EDID set, wherein the EDID set is divided for transmission into preset units (e.g., transmission units, read units, load units, etc.). In some embodiments, the EDID set may be greater than a defined data size (e.g., 256 bytes). That is, multi-EDID read operation may include operations whereby the source device 50 reads the EDID set—which is greater in size than the defined size (e.g., 256 bytes)—by dividing the EDID set into preset units (e.g., transmission units, read units, load units, etc.). In some embodiments, such preset units may be defined in accordance with a size of a memory associated with the sink device 100. In this regard, examples of various multi-EDID read operations will be described hereafter in some additional detail with reference to FIGS. 8, 9A, 9B, 9C, and 12.

In some embodiments, the sink device 100 may generally include an HDMI receiver 110 configured to receive content data, a system-on-chip 120, and a non-volatile memory 130.

The SoC 120 may be used to determine whether the source device 50 supports a multi-EDID read operation through (e.g.,) a display data channel (DDC). For example, the DDC may operate in accordance with a communication protocol defined by the Video Electronics Standards Association (VESA), such that the HDMI transmitter 51 may exchange (e.g.,) environment information and status information with the HDMI receiver 110. One example of the DDC will be described hereafter in some additional detail with reference to FIG. 2.

Upon determining that the source device 50 supports the multi-EDID read operation, the SoC 120 may sequentially transmit one or more EDID group(s) selected from the EDID set to the source device 50 through the DDC. An EDID group may include a number of EDID, one EDID or a portion of an EDID, so long as the EDID group conforms with a transmission unit. Here, the EDID set may be stored in the non-volatile memory 130. Examples of an EDID group will be described hereafter in some additional detail with reference to FIGS. 9A, 9B, and 9C. Alternately, upon determining that the source device 50 does not support the multi-EDID read operation, the SoC 120 may transmit the EDID to the source device 50 using a legacy data transmission approach (e.g., an earlier HDMI standard).

In some embodiments, the SoC 120 may include a processor 121 and a cache memory 122, wherein the processor 121 may be used to determine whether the source device supports the multi-EDID read operation through the DDC.

In some embodiments, upon determining that the source device supports the multi-EDID read operation, the processor 121 may sequentially transmit the EDID set to the source device 50 in accordance with (or based on) the EDID group corresponding to the size of the cache memory 122 as a transmission unit related to the size of the EDID set stored in the non-volatile memory 130, as well as a size of the cache memory 122. Thus, the EDID set may include all respectively identifiable EDID stored in the non-volatile memory 130, whereas the EDID group may include all respectively identifiable EDID to-be-loaded into the cache memory 122.

In some embodiments, upon determining that the multi-EDID read operation is supported, the processor 121 may compare a size of the EDID set stored in the non-volatile memory 130 with a size of the cache memory 122. If the size of the EDID set stored in the non-volatile memory 130 is greater than the size of the cache memory 122, the processor 121 may load at least a portion of the EDID set stored in the non-volatile memory 130 into the cache memory 122. In this manner, the processor 121 may transmit the EDID loaded into the cache memory 122 to the source device 50 through the DDC. Further in this regard, the processor 121 may load the EDID group corresponding to the size of the cache memory 122 to the cache memory 122 so that the EDID group corresponding to the size of the cache memory 122 may thereafter be transmitted to the source device 50 in accordance with a transmission unit. To this end in some embodiments, the processor 121 may include a pointer register indicating a target to be loaded. One example of the pointer register use will be described hereafter in some additional detail with reference to FIGS. 9A, 9B, and 9C.

Accordingly, the cache memory 122 may be configured to temporarily store one or more EDID. For example, in some embodiments, each EDID (as well as the additional EDID defined by the VESA) may have a size of 128 bytes. That is, if the size of the cache memory 122 designated to load the EDID is assumed to be 256 bytes, the cache memory 122 may load a 128-byte EDID and a 128-byte additional EDID. However, the scope of the inventive concept is not limited to only this example. Under the foregoing assumptions, the 128-byte EDID and the 128-byte additional EDID loaded into the cache memory 122 constitute an EDID group. One example of loading an EDID group into the cache memory 122 will be described hereafter in some additional detail with reference to FIGS. 9A, 9B, and 9C. The cache memory 122 may be implemented using one or more type(s) of volatile memory, such as for example, a dynamic random access memory (DRAM), a static random access memory (SRAM), etc.

The non-volatile memory 130 may be implemented using one or more type(s) of non-volatile memory, such as for example, flash memory (e.g., NAND flash memory and/or NOR flash memory), read only memory (ROM), erasable programmable read-only memory (EPROM), electrically erasable programmable read-only memory (EEPROM), etc.

The non-volatile memory 130 may be used to store an EDID set. Here, the non-volatile memory 130 may be organized and operated in accordance with a plurality of memory blocks 131. Accordingly, enhanced EDID (E-EDID) may be stored in the plurality of memory blocks 131. For example, a first EDID may be stored in a first memory block (EDID MB 0), a first additional EDID may be stored in a second memory block 1 (EDID MB 1), . . . and a second additional EDID may be stored in an Nth memory block N (EDID MB N) (e.g., N may be an integer greater than 1). In one example, the size of each memory block may be 128 bytes, however the scope of the inventive concept is not limited thereto.

Although not shown in FIG. 1, the sink device 100 may further include one or more of a user input module, a communicator, a display, and an audio output unit.

Of particular note, HDMI systems according to embodiments of the inventive concept may support a broader range of contemporary and emerging performance requirements. That is, even if a quantity of EDID information (e.g., EDID information expressing certain system capabilities) increases, constituent EDID may be supported without necessarily increasing memory space within the SoC, thereby reducing the design and production costs associated with the SoC. Further, user satisfaction may be improved by providing high-resolution images according to various types of EDID.

Of additional note, sink devices according to embodiments of the inventive concept may be compatible with an existing (or legacy) source devices that do not otherwise support multi-EDID read operation.

Figure 2:
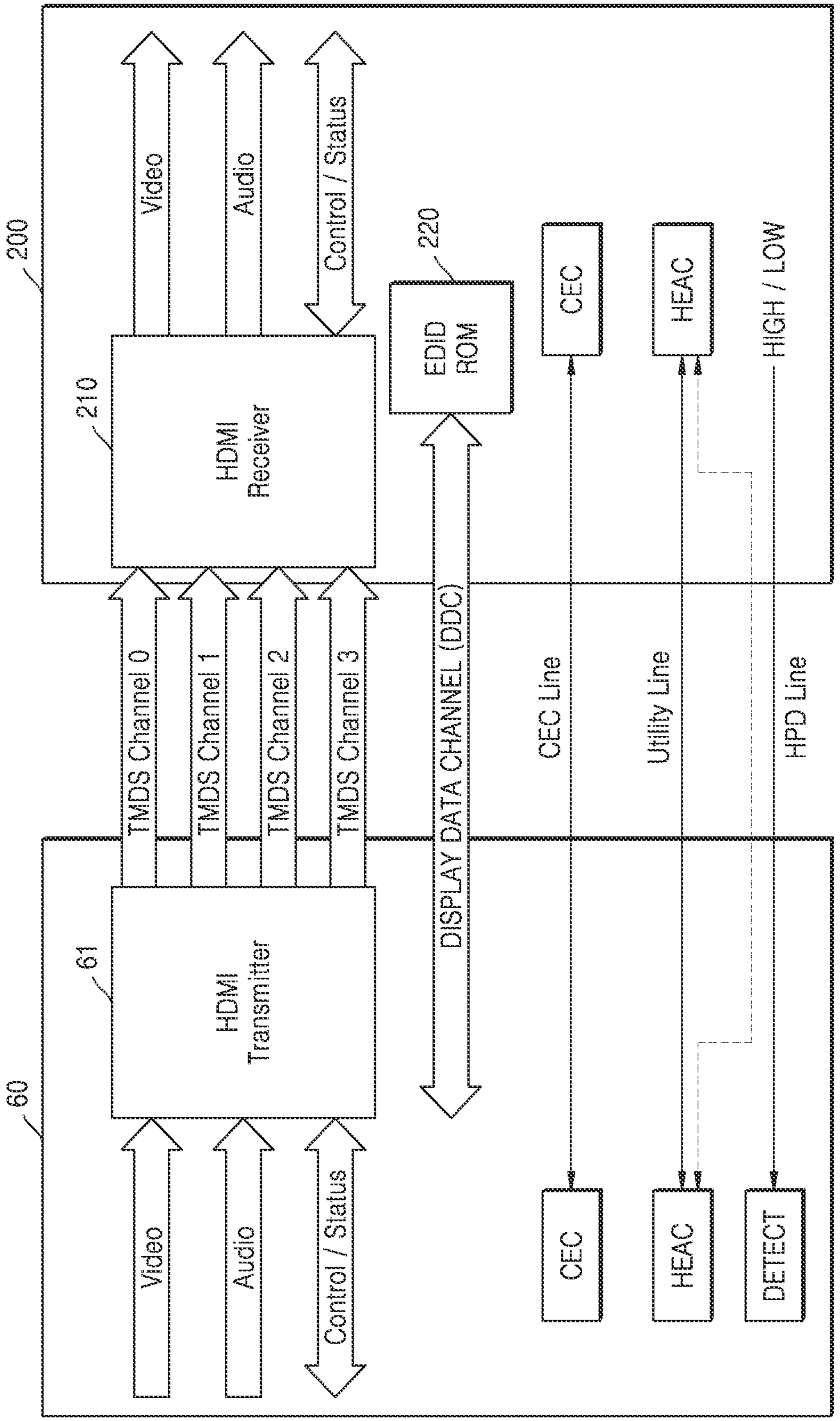
FIG. 2 is a block diagram illustrating an interface between a source device and a sink device in an HDMI system according to embodiments of the inventive concept.

FIG. 2 is a block diagram illustrating in one example an interface between a source device 60 and a sink device 200 in an HDMI system 20 according to embodiments of the inventive concept.

Referring to FIG. 2, an HDMI 2.1a (or higher) transmission standard may be applied to the HDMI system 20. In this regard, HDMI 2.1a has a basic structure substantially similar to previous HDMI versions, albeit with some differences. For example, HDMI 2.1a may provide a transmission bandwidth of 48 Gbps—more than 2.5 times higher than the 18 Gbps transmission bandwidth provided by HDMI 2.0. In some embodiments, HDMI 2.1a may be used to support 48 Gbps (e.g., 12 Gbps per lane (or channel), 4 lanes driven), 40 Gbps (e.g., 10 Gbps per lane, 4 lanes driven), 32 Gbps (e.g., 8 Gbps per lane, 4 lanes driven), 24 Gbps (e.g., 6 Gbps per lane, 4 lanes driven), 18 Gbps (e.g., 6 Gbps per lane, 3 lanes driven), or 9 Gbps (e.g., 3 Gbps per lane, 3 lanes driven). Thus a total of 6 transmission bandwidths associated with HDMI 2.1a may be transmitted, even assuming 10-bit color encoded HDR content ranging from 4 K to 144 Hz, as well as supporting uncompressed transmission ranging from 8K to 30 Hz. Previous versions of HDMI 2.1a transmit content signals through three channels. In some embodiments, previous versions of HDMI 2.1a use three channels out of four channels as data channels and one channel as a clock channel. That is, in HDMI 2.1a, transition minimized differential signaling (TMDS) channel 3, which is a data channel, may be used as a clock channel in a previous version of HDMI 2.1a. In contrast, HDMI 2.1a may be used to transmit a content signal through four channels and does not require a clock channel for transmitting a separate clock signal, since the clock signal is embedded in the content. Therefore, a data rate associated with HDMI 2.1a is much higher than that associated with previous versions of HDMI 2.1a.

For an HDMI system, a TMDS may be used in a physical layer; high-bandwidth digital content protection (HDCP) may be used to encrypt signals for content security; EDID may be used for device-to-device authentication; and consumer electronics control (CEC) may be used to connect the HDMI system to a control system.

HDMI cables and connectors include four differential pairs constituting four TMDS channels (e.g., TMDS channel 0, TMDS channel 1, TMDS channel 2, and TMDS channel 3) for data transmission. These channels may be used to transmit video data, audio data, and/or auxiliary data. These channels may also (or alternatively) be used to transmit a pattern signal to the sink device 100 during Fixed Rate Link (FRL) link training. Here, the term "channel" may alternately be referred to as a "lane." The source device 60 may include an HDMI transmitter 61 configured to transmit content data, and the sink device 200 may include an HDMI receiver 210 configured to receive the content data.

As noted above in relation to the description of FIG. 1, HDMI may include a DDC which is configured to operate as an Inter-Integrated Circuit (I2C)-based communication channel (i.e., operate in accordance with an I2C-based communication protocol). Thus, the DDC may use an I2C-based communication standard to exchange various information between the source device 60 and the sink device 200. For example, the DDC may be used by the source device 60 to determine performance characteristics of the sink device 200. That is, the source device 60 may acquire EDID written in EDID ROM 220 of the sink device 200 through the DDC, and determine a performance level of the sink device 200 in accordance with the acquired EDID. In some embodiments, the sink device 200 may prepare for communication with the source device 60 by loading an EDID value to a designated address (e.g., 0xA0/0xA1) as an I2C slave. Once preparation is complete, the source device 60 may read EDID information at the corresponding address through DDC communication.

Consumer Electronics Control (CEC), a feature of HDMI connected devices, may be used to provide high-level control functions between all the various audio/video (AV) products. CEC may connect both the source device 60 and the sink device 200 in the system through one control line. While the DDC is formed in a one-to-one relationship between the source device 60 and the sink device 200, CEC connects all devices in the system, so that the DDC may be utilized in the case of controlling all devices by a single remote controller. A port connection signal may be transmitted to the sink device 200 through a CEC line. The port connection signal may be a signal indicating that the connection between the source device 60 and the sink device 200 is maintained without being disconnected. An identification (ID) signal identifying the source device 60 may be transmitted to the sink device 200 through a CEC line.

An HDMI Ethernet and audio return channel (HEAC) may be used to provide Ethernet-compatible data networking in the opposite direction to TMDS between access devices and an audio return channel. Ethernet-compatible data may be transmitted/received through a utility line (CEC Line) in HEAC.

The sink device 200 may transmit a hot plug detect (HPD) signal to the source device 60 through an HPD line, thereby informing the source device 60 that the source device 60 is electrically connected to the sink device 200. In some embodiments, when the source device 60 is electrically connected to the sink device 200, the sink device 200 may change a signal level of the HPD signal from a low level (hereafter, "low") to a high level (hereafter, "high").

HDMI consistent with embodiments of the inventive concept supports a new status and control data channel (SCDC) standard, as compared with HDMI 2.0. Like DDC, the SCDC may operate in accordance with an I2C-based communication protocol. Hence, the SCDC may implement a one-to-one communication protocol that enables data exchange between the source device 60 and the sink device 200. Therefore, the SCDC may use an I2C specification to read EDID and other information in order to extend the I2C specification by providing a mechanism for the sink device 200 to request a status check by the source device 60. To this end, a new I2C address (0xA8/0xA9) area may be assigned. Information related to status or configuration may be exchanged through the SCDC. The sink device 200 including the SCDC has to include a valid HDMI HF-vendor-specific data block (VSDB) in EDID, and set a value of the SCDC_Present bit to "1". Before accessing the SCDC, the source device 60 may determine whether the sink device 200 includes the valid HDMI HF-VSDB in the EDID in which the value of the SCDC_Present bit is set to "1". If the value of the SCDC_Present bit is not "1", the source device 60 may not perform SCDC access.

The HDMI consistent with embodiments of the inventive concept supports the new ID communications channel (IDCC) standard, as compared with HDMI 2.1a. The IDCC, like DDC, may be configured to operate in accordance with an I2C-based communication protocol. Thus, the IDCC may be a communication protocol through which a sink ID associated with the sink device 100 is transmitted to the source device 50 or a source ID associated with the source device 50 is transmitted to the sink device 100. The IDCC may be used to transmit the source ID, the sink ID and/or a cable ID bi-directionally between adjacent devices. The IDCC may use the same I2C interface and address used to read the E-EDID.

Figure 3:
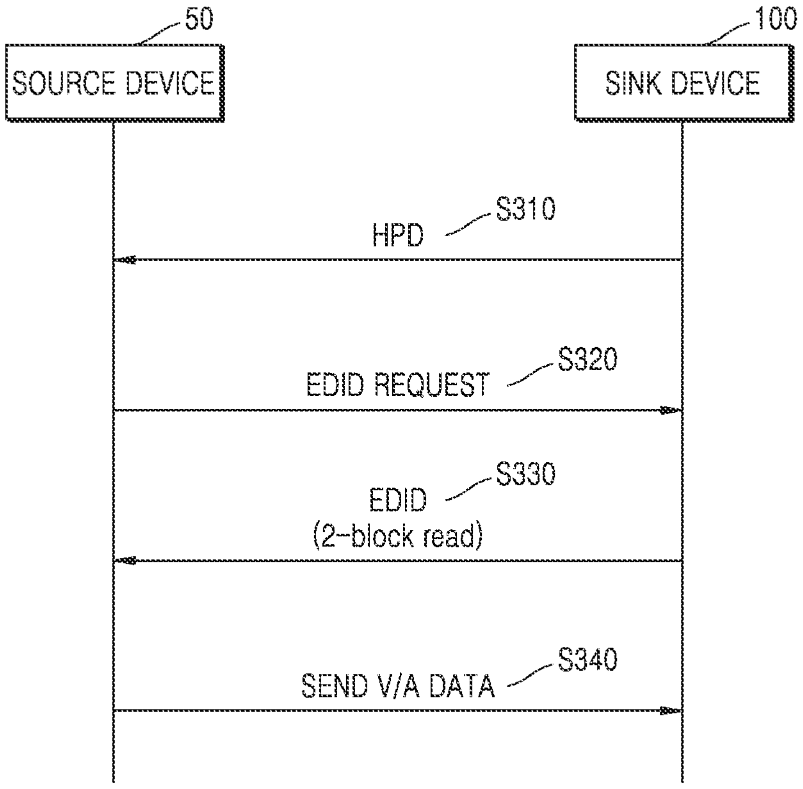
FIG. 3 is a flow diagram illustrating signals transmitted and received when a source device and a sink device are connected according to embodiments of the inventive concept.

FIG. 3 is a flow diagram illustrating various signals communicated (i.e., transmitted and/or received) between the source device 50 and the sink device of FIG. 1 when the source device 50 is connected to the sink device 100.

Referring to FIG. 3, the sink device 100 may indicate electrical connection with the source device 50 by changing a signal level of an HPD signal from low to high (S310).

The source device 50 may then transmit an EDID request for reading EDID to the sink device 100 (S320).

The source device 50 may read the EDID from the sink device 100 (S330). Here, the structure of the EDID may be expressed in block units (or memory block units). An exemplary block unit size is 128 bytes. The sink device 100 may include two or more blocks. For example, the sink device 100 may include two blocks, wherein the EDID is stored in one of the two blocks and an additional EDID is stored in the other one of the two blocks. In some embodiments, the operation of reading EDID may be performed in accordance with block units corresponding to an I2C address at which the corresponding EDID is stored.

Thus, assuming that the sink device 100 includes first and second blocks, in order for the source device 50 to read the EDID stored in the first block, the source device 50 accesses the corresponding I2C address and reads data stored in the first block. Then, in order for the source device 50 to read the EDID stored in the second block, the source device 50 accesses the corresponding I2C address and reads data stored in the first and second blocks at once.

Further in this regard, the source device 50 may parse reading of the EDID value, and send content data V/A DATA (e.g. video and/or audio data) to the sink device 100 at a resolution supported by the sink device 100 (S340).

Recently, as the sink device 100 supports HDMI 2.1a and a gaming mode, supportable resolutions have increased, and as supportable resolutions have increased, more EDID are required. Here, a resolution defined by the standard may be expressed using as few as a single bit. However, in a case wherein resolution is not defined by the standard, certain timing information and the like may be required, so a plurality of bytes may be required. For example, because Detailed Timing Descriptors comprising 18 byte according to the standard are used, 18 bytes are further required as an additional storage space for storing the EDID in order to add a newly supportable resolution to the sink device 100. The newly supportable resolution, timing information, etc. may be included in the E-EDID.

FIG. 4 is an expanded block diagram illustrating an EDID set 400 according to embodiments of the inventive concept.

Referring to FIG. 4, the EDID set 400 may include EDID 410 based on HDMI and at least one Consumer Electronics Association (CEA) extension data (or CEA-861 Extension) 420 and 430, wherein each of the EDID 410 and the CEA extension data 420 and 430 has a data structure of 128 bytes. Thus, the EDID set 400 may correspond to the E-EDID.

The EDID 410 may be a data structure including various information associated with a display device defined by VESA. The EDID 410 may be communicated to a source device via the DDC. Here, the various information may include, for example, a header, product identification information, EDID version information, basic display variables, color space definitions, timing information of all resolutions supported by a display, extension flags, checksums, etc. The product identification information may include a manufacturer's ID, a product ID code, a serial number, a manufacturing date, and the like. The basic display variables may include an image input type, a display size, power management, a gamma value, a timing function, environment setting, and the like.

At least one CEA extension data 420 and 430 may be configured according to a CEA-861-based EDID extension data format. In accordance with this format, each CEA extension data (or data block collection) may include an audio data block, a video data block, a vendor-specific data block, and the like. The sink device 100 may include information on a media format supported by the sink device 100 in a data block collection of each piece of CEA extension data. The vendor-specific data block may include information on whether SCDC is supported or the like, as will be described hereafter in some additional detail with reference to FIG. 6.

In HDMI versions prior to HDMI 2.1a, the source device may be implemented so that usually only two blocks in which EDID is stored may be read. However, beginning with HDMI 2.1a, the amount of information associated with an EDID (e.g., supportable resolution, certain timing information, etc.) has increased, such that additional storage space for storing more EDID may be required.

It is not difficult to expand the storage capacity of the non-volatile memory included in the sink device 100. However, the cost of additionally mounting the memory block in the cache memory 122 included in the SoC 120 can be significant because designers often need to redesign the SoC 120. In addition, because the previously released source device may read only two blocks in which the EDID is stored, the previously released source device may not properly read the EDID due to the extended EDID block and may therefore malfunction. Worse, a user may believe that the malfunction is caused in the sink device rather than the source device, and may file a complaint with the company that manufactures the sink device.

In response to these potential problems, certain methods have been proposed that change a portion of the previously stored EDID into new EDID, while maintaining the storage capacity of the cache memory in an existing sink device. However, such methods may not accurately replicate the original capabilities of the existing sink device, thereby frustrating the user.

In other methods, designers may prepare EDID sets stored in two blocks as various combinations in the existing sink device, and a user may directly select an EDID type. However, such methods prove inconvenient to users, and compatibility problems may arise between devices.

Accordingly, a new EDID read scheme capable of maintaining the storage capacity of memory included in the SoC and yet transferring the complete capability of the sink device to the source device is required.

Figure 5:
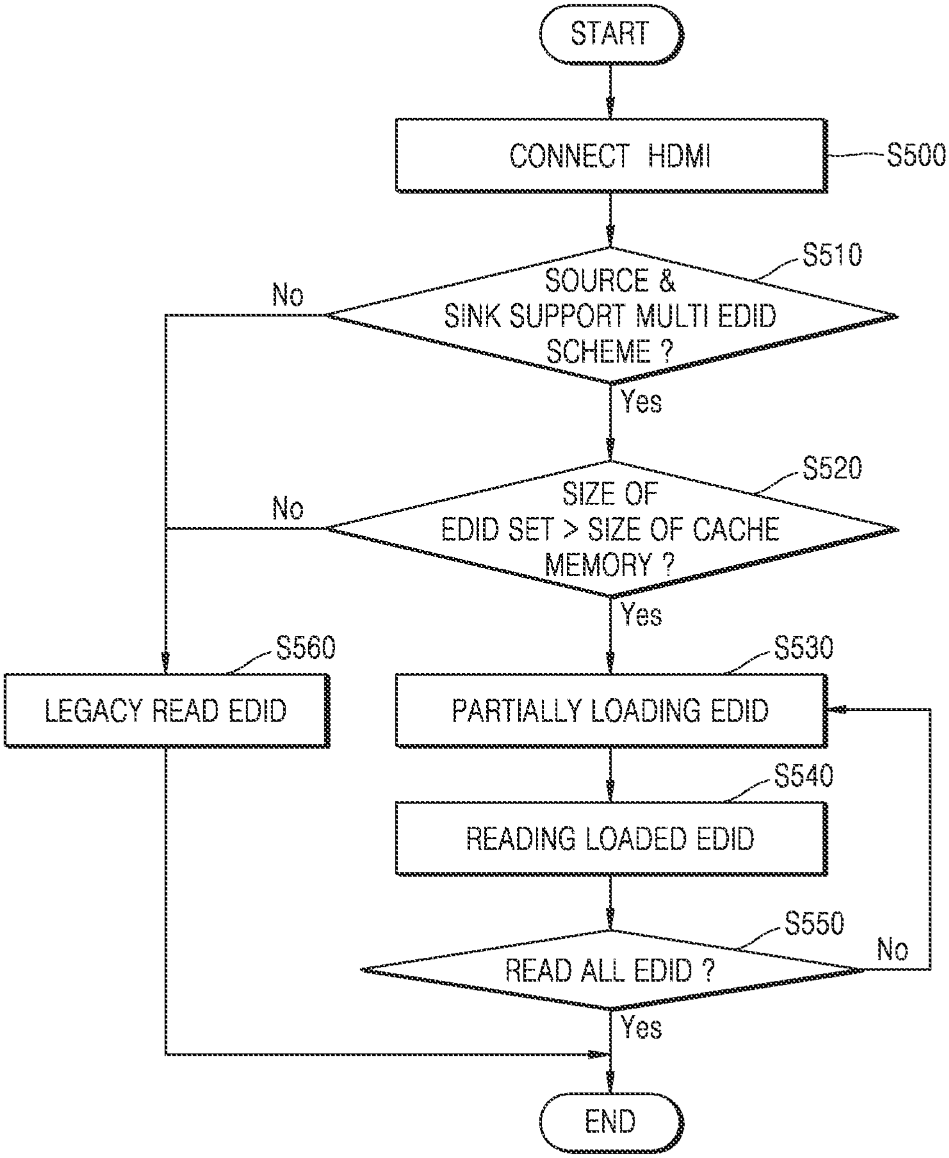
FIG. 5 is a flowchart illustrating a multi-EDID read operation according to embodiments of the inventive concept.

FIG. 5 is a flowchart illustrating in one example a read operation for EDID according to embodiments of the inventive concept.

Referring to FIG. 5, an HDMI connection operation is performed (S500). In some embodiments, when the source device 50 is connected to the sink device 100 through an HDMI cable, the processor 121 transmits a HPD signal of a high level to the source device 50.

Then, a determination is made as to whether both the source device 50 and the sink device 100 support a multi-EDID scheme (S510). In this regard, the phrase "multi-EDID scheme" refers to a multi-EDID read operation consistent with embodiments of the inventive concept. In some embodiments, when the sink device 100 supports the multi-EDID read operation, the processor 121 may be used to determine whether the source device 50 supports the multi-EDID read operation through the DDC. Whether the multi-EDID scheme (or the multi-EDID read operation) is supported may be determined based on the SCDC structure. Exemplary SCDC structures will be described hereafter in some additional detail with reference to FIGS. 7A, 7B, and 7C, as well as exemplary IDCC structures will be described hereafter with reference to FIGS. 10 and 11.

If both the source device 50 and the sink device 100 support the multi-EDID scheme (S510=Yes), then a determination of whether a size of the EDID set is greater than a size of the cache memory is made (S520). In some embodiments, the size of the EDID set may correspond to the size of respective memory blocks 131 included in the non-volatile memory 130. The processor 121 may compare the size of the memory blocks 131 with the size of the cache memory 122.

If the size of the EDID set is greater than the size of the cache memory (S520=Yes), the EDID may be partially loaded (S530). (Here, it is assumed that the size of each memory block of the non-volatile memory 130 is 128 bytes and that a number of memory blocks 131 is 6). Thus, the cache memory 122 includes two, 128 byte memory blocks, and the processor 121 divides six memory blocks into three groups by two, and loads the EDID stored in one group (e.g., a first group) into the cache memory 122. One example of partially loading the EDID will be described hereafter in some additional detail with reference to FIGS. 9A, 9B, and 9C.

After partially loading the EDID (S530), the loaded EDID may be read (540). In some embodiments, the source device 50 may be used to read the loaded EDID. The sink device 100 may transmit the loaded EDID to the source device 50.

A determination is then made as to whether all EDID have been read (S550). In some embodiments, the processor 121 may be used to determine whether all EDID have been read by monitoring EDID currently loaded into the cache memory 122.

For example, because the EDID currently loaded into the cache memory 122 is stored in the first group, a case in which all EDID are not read may arise. In this case (S550=No), method step S530 is again performed. In some embodiments, the processor 121 loads the EDID stored in another one (e.g., a second group) of three groups into which six memory blocks are divided into the cache memory 122. Thereafter, method steps S540 and S550 are again performed, and because a read operation on the remaining one of the three groups (e.g., a third group) is not performed, method steps S530, S540, and S550 are performed again. When the read operation on the EDID included in the third group is complete, it is determined that all EDID have been read.

Alternately, if either the source device 50 or the sink device 100 does not support the multi-EDID scheme (S510=No), or the size of the EDID set is less than or equal to the size of the cache memory (S520=No), then reading of existing EDID may be performed according to a legacy approach (S560). Here, a method of reading the existing EDID may require that the source device read only up to two blocks storing the EDID in accordance with one or more legacy HDMI approaches.

Consistent with embodiments of the inventive concept, the source device 50 supports a scheme for reading extended EDID without necessarily changing the storage capacity of the cache memory 122 of the SoC 120, thereby reducing the manufacturing costs associated with the SoC, preventing malfunction of the source device 50, improving compatibility of the HDMI system 10, providing images of various resolutions to users, and improving user convenience.

Hereinafter, an embodiment of the SCDC structure will be described as a method of determining whether a multi-EDID read operation is supported and performing a multi-EDID read operation.

FIG. 6 is a table listing an HDMI forum (HF)-vendor-specific data block (VSDB) according to embodiments of the inventive concept.

Referring to FIGS. 1, 4 and 6, the HF-VSDB may be a data block in which vendor-specific data may be defined. The HDMI may define certain information in the HDMI using the data block. The HF-VSDB may be located in the CEA extension version 3 in the E-EDID of the sink device 100 (refer to "Vendor Specific Tag Code (=3)" of FIG. 6).

Here, an SCDC_Present field (refer to "SCDC_Present" in FIG. 6) may be a field indicating that the sink device supports the SCDC function, and when a bit value of the field is set to 1, the sink device supports the SCDC function.

An RR Capable field is a field indicating whether the sink device may initiate an SCDC read request, and when a bit value of the field is set to 1, the sink device may initiate the SCDC read request.

The sink device 100 may include the HF-VSDB shown in FIG. 6, and the bit value of the SCDC_Present field in the HF-VSDB may be set to 1.

FIGS. 7A, 7B, and 7C are respective tables listing various status and control data channel structures (SCDCS) according to embodiments of the inventive concept.

The SCDCS may be stored in the sink device, may have a data structure, such as the table shown in FIG. 6, and may be implemented as a register. Here, the column "R/W" indicates whether the source device is able to only read data of the SCDCS or is able to both read and write data from the point of view of the source device. "R" represents read only permission, whereas "R/W" represents read and write permission.

To support the multi-EDID read operation, a sink support field, a source support field, an EDID ready field, and an EDID finish field may be newly assigned.

In some embodiments, the sink support field, the source support field, the EDID ready field, and the EDID finish field may be assigned to reserved fields in the existing SCDCS.

Referring to FIG. 7A, for example, a sink support field (e.g., "IS_Sink_Support" of FIG. 7A), a source support field (e.g., "IS_Source_Support" of FIG. 7A), an EDID ready field (e.g., "IS_EDID_Ready" of FIG. 7A), and an EDID finish field (e.g., "IS_EDID_Finish" of FIG. 7A) may be assigned to offset values of the SCDCS, 0x03, 0x04, 0x05, and 0x06, respectively.

For other examples and with reference to FIG. 7B, a sink support field (e.g., "IS_Sink_Support" of FIG. 7B), a source support field (e.g., "IS_Source_Support" of FIG. 7B), EDID ready field (e.g., "IS_EDID_Ready" of FIG. 7B), and an EDID finish field (e.g., "IS_EDID_Finish" of FIG. 7B) may be assigned to offset values of the SCDCS, 0x57, 0x58, 0x59, and 0x5A, respectively.

Embodiments in which the sink support field, the source support field, the EDID ready field, and the EDID finish field may be assigned to the offsets shown in FIG. 7A or 7B are described, but the scope of inventive concept is not limited thereto and the sink support field, the source support field, the EDID ready field, and the EDID finish field may also be assigned to other reserved offsets in the SCDCS.

In other embodiments, the sink support field, the source support field, the EDID ready field, and the EDID finish field may be assigned to the manufacturer-specific fields (e.g., "Manufacturer Specific" of FIGS. 7A and 7B) in the existing SCDCS.

Referring to FIG. 7C, for example, a sink support field (e.g., "IS_Sink_Support" of FIG. 7C), a source support field (e.g., "IS_Source_Support" of FIG. 7C), an EDID ready field (e.g., "IS_EDID_Ready" of FIG. 7C), and an EDID finish field (e.g., "IS_EDID_Finish" of FIG. 7C) may be assigned to offset values of the SCDCS, 0xDE, 0xDF, 0xE0, and 0xE1, respectively.

Still other embodiments in which the sink support field, the source support field, the EDID ready field, and the EDID finish field may be assigned to the offsets shown in FIG. 7C are described, but the scope of the inventive concept is not limited thereto and the sink support field, the source support field, the EDID ready field, and the EDID finish field may also be assigned to other manufacturer-specific fields in the SCDCS.

The sink support field may be a field indicating whether the sink device 100 supports a multi-EDID read operation. When a bit value of the sink support field is set to a first bit value (e.g., "1"), the sink device 100 supports the multi-EDID read operation. Alternately, when the bit value of the sink support field is set to a second bit value (e.g., "0"), the sink device 100 does not support the multi-EDID read operation.

The source support field may be a field indicating whether the source device 50 supports the multi-EDID read operation. When the bit value of the source support field is set to the first bit value (e.g., "1"), the source device 50 supports the multi-EDID read operation. Alternately, if the bit value of the source support field is set to the second bit value (e.g., “0”), the source device 50 does not support the multi-EDID read operation.

The EDID ready field may be a field indicating whether an EDID group is loaded into the cache memory 122. When a bit value of the EDID ready field is set to the first bit value (e.g., “1”), the EDID group is completely loaded into the cache memory 122. Alternately, if the bit value of the EDID ready field is set to the second bit value (e.g., “0”), it is before the EDID group is loaded into the cache memory 122.

The EDID finish field may be a field indicating whether transmission of the EDID set to the source device 50 is completed. When the bit value of the EDID finish field is set to the first bit value (e.g., “1”), this means that all EDID sets stored in the non-volatile memory 130 are completely loaded and transmitted, and there is no EDID to load anymore. Alternately, if the bit value of the EDID finish field is set to the second bit value (e.g., “0”), there is still EDID to be loaded into the cache memory 122.

Hereinafter, a method of performing a multi-EDID read operation using the SCDC structure will be described.

Figure 8:
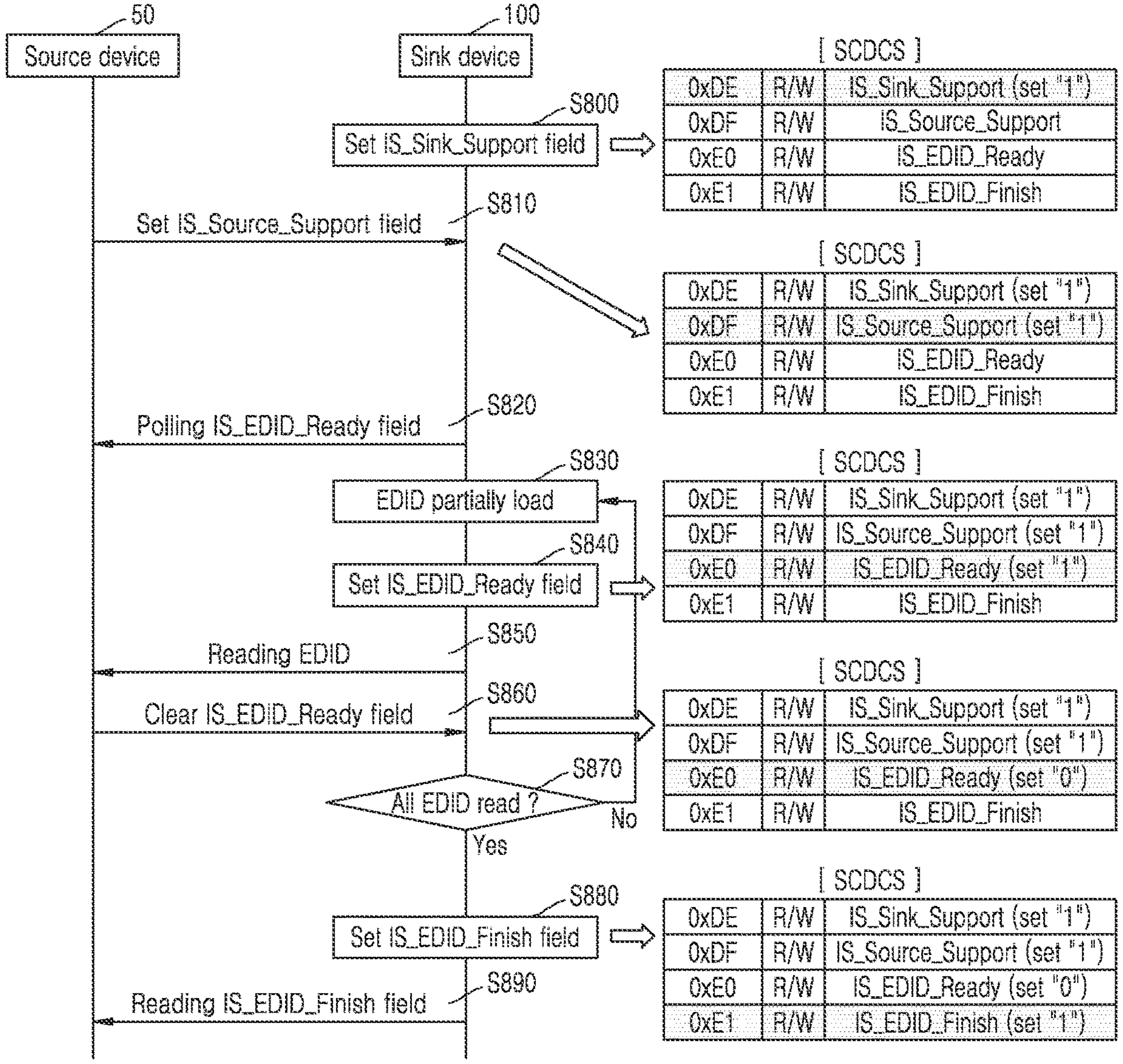
FIG. 8 is a composite flow diagram/flowchart diagram illustrating a multi-EDID read operation through a status and control data channel (SCDC) according to embodiments of the inventive concept.

FIG. 8 is a composite flow diagram/flowchart illustrating a multi-EDID read operation through an SCDC according to embodiments of the inventive concept.

Referring to FIGS. 1 and 8, it is assumed that the size of the EDID set stored in the non-volatile memory 130 is greater than the size of the cache memory 120. It is further assumed that the sink support field, the source support field, the EDID ready field, and the EDID finish field are assigned to the offset values of SCDCS, 0xDE, 0xDF, 0xE0, and 0xE1 in the SCDCS, respectively. It is still further assumed that the first bit value set in the field is 1 and the second bit value set in the field is 0.

Under these assumptions, the sink device 100 may set a bit value for the sink support field of the SCDCS (S800). In some embodiments, the processor 121 sets the bit value of the sink support field of the SCDCS to 1. (See e.g., “IS_Sink_Support” (set “1”) in first SCDCS state diagram of FIG. 8).

Then, the source device 50 may set a bit value in the source support field of the SCDCS through the SCDC communication protocol (S810). In some embodiments, the source device 50 may write a bit value 1 in the source support field of the SCDCS (See, e.g., “IS_Source_Support” (set “1”) in second SCDCS state diagram of FIG. 8). Here, the sink device 100 may determine whether the source device 50 supports the multi-EDID read operation based on the state of a structure of the SCDCS. For example in some embodiments, the processor 121 may determine whether a multi-EDID read operation is supported by identifying a bit value of the source support field included in the structure of the SCDCS by performing communication through the SCDC. If both the source device 50 and the sink device 100 support the multi-EDID read operation, the bit value of the source support field may be the same as the bit value of the sink support field.

The source device 50 may now continuously poll the EDID ready field of the SCDCS through the SCDC communication protocol (S820). Polling may be referred to as screen identification.

The sink device 100 may perform partially loading of the EDID (S830). In some embodiments, the processor 121 may load the EDID group obtained by dividing the size of the EDID set by a unit of the size of the cache memory 122 into the cache memory 122. That is, the sink device 100 may set a bit value in the EDID ready field of the SCDCS (S840). In some embodiments, the processor 121 may set the bit value of the EDID ready field of the SCDCS to 1 (See, e.g., change in “IS_EDID_Ready” field between second and third SCDCS status diagrams of FIG. 8). Because the source device 50 continuously polls the EDID ready field of the SCDCS (S820), when the bit value of the EDID ready field of the SCDCS is set to 1, the source device 50 may determine that the EDID has been loaded.

Now, by operation of the source device 50 the EDID may be read (S850).

Once the multi-EDID read operation is complete, the source device 50 may clear the bit value set in the EDID ready field of the SCDCS through the SCDC communication protocol (S860). In some embodiments, the source device 50 writes a bit value of 0 in the EDID ready field of the SCDCS through the SCDC communication protocol. (See, e.g., change in “IS_EDID_Ready field” between third and fourth SCDCS status diagrams of FIG. 8). That is, the processor 121 may determine whether reading of the EDID by the source device 50 is complete in relation to the EDID ready field of the SCDCS. Alternately, after a value of 1 is set in the EDID ready field and the source device 50 complete the multi-EDID read operation, the processor 121 may receive a clear request requesting that the bit value set in the EDID ready field should be cleared with a second bit value (e.g., from the source device 50). In addition, the processor 121 may set the bit value of the EDID ready field to 0.

The sink device 100 may then determine whether the multi-EDID read operation for all EDID has been completed (S870). If the multi-EDID read operation for all EDID has not been completed (S870=No)—that is, if there is a subsequent EDID group waiting to be transmitted from the EDID set after bit value 0 is set in the EDID ready field—the processor 121 may load a subsequent EDID group to the cache memory 122 (S830) and set the bit value of the EDID ready field to 1.

Once the multi-EDID read operation for all EDID is complete (S870=Yes)—that is, once the entire EDID set has been successfully transmitted—the sink device 100 may set a bit value of 1 in the EDID finish field (S880). In some embodiments, when the EDID set is completely transmitted, the processor 121 may set the bit value of the EDID finish field to 1. (See, e.g., change in “IS_EDID_Finish” (set “1”) between the fourth and fifth SCDCS status diagrams of FIG. 8).

Then, the source device 50 may determine to terminate the multi-EDID read operation in response to reading the EDID finish field of the SCDCS through the SCDC communication protocol (S890).

From the foregoing, those skilled in art will appreciate that HDMI systems according to embodiments of the inventive concept are capable of supporting multi-EDID read operation in order to provide images of various resolutions to the user, thereby enhancing user interactions. Further, HDMI systems according to embodiments of the inventive concept provide images having a greater variety of resolutions, as compared with source devices and/or sink devices unable to support multi-EDID read operation, thereby enhancing overall product competitiveness.

Figure 9A:
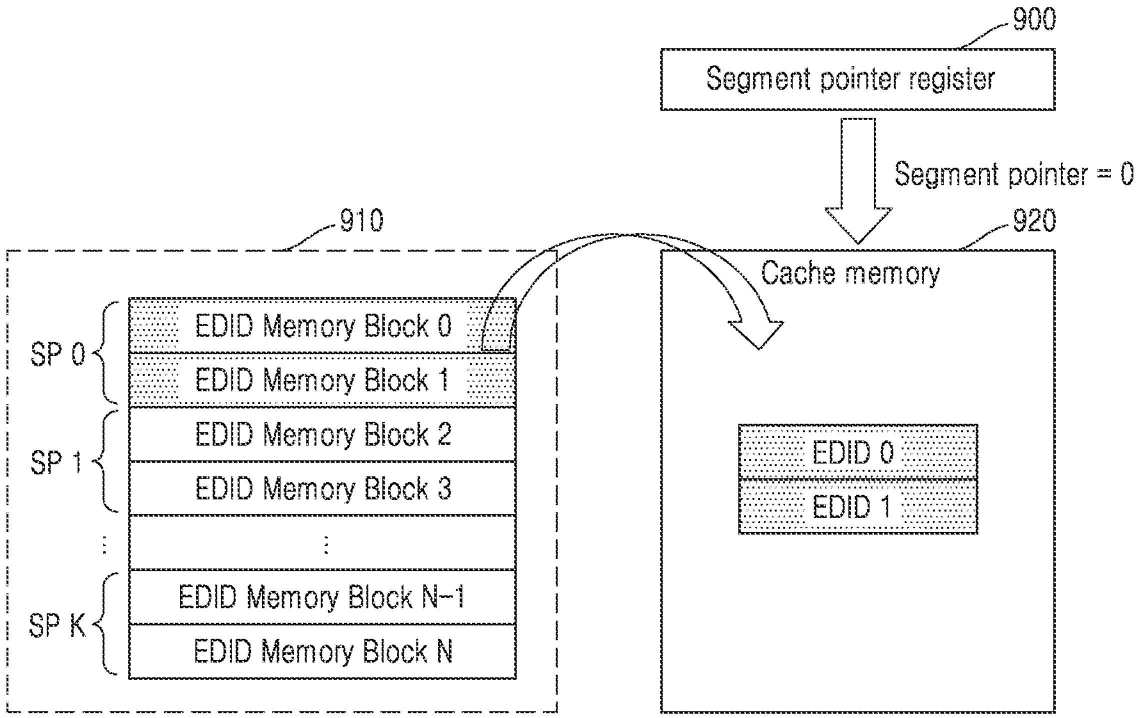
FIGS. 9A, 9B, and 9C are respective conceptual diagrams illustrating an operation of loading an EDID set stored in a non-volatile memory into a cache memory according to embodiments of the inventive concept.
Figure 9B:
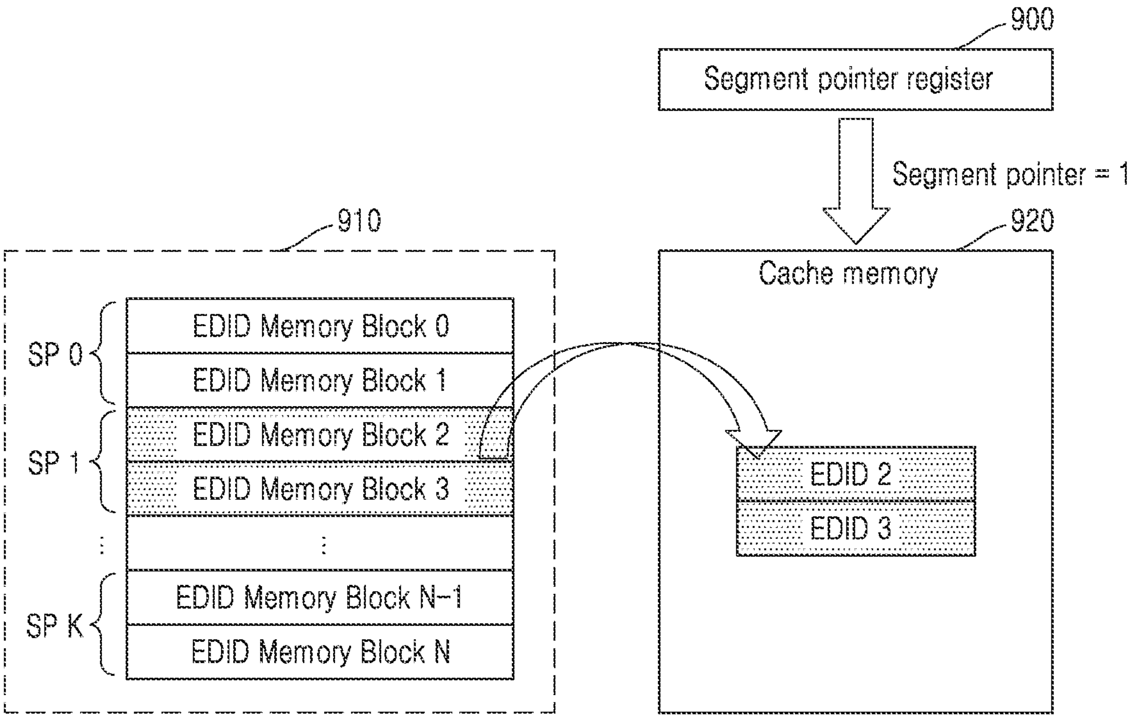
Figure 9C:
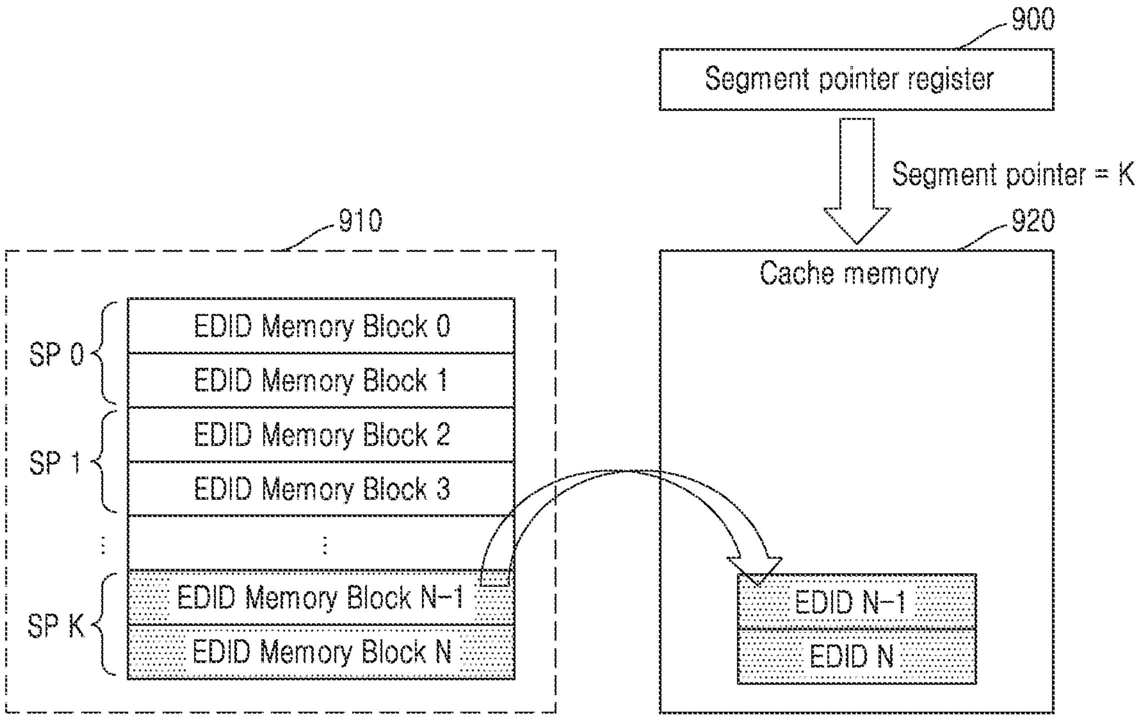

FIGS. 9A, 9B, and 9C are respective, conceptual diagrams further illustrating in one example of loading an EDID set stored in a non-volatile memory into a cache memory according to embodiments of the inventive concept.

Referring to FIGS. 1, 5 (S530), 8 (S830), 9A, 9B, and 9C, the processor 121 may include a segment pointer register 900, wherein the segment pointer register 900 may be used to store a segment pointer indicating memory blocks to be loaded from among a plurality of memory blocks 910 provided by the non-volatile memory 130. In this regard, the memory blocks 910 may be referred to as EDID memory blocks. The size of each memory block 910 may vary by design, but is here assumed to be 128 bytes. EDID or CEA extension data may be stored in each EDID memory block. As noted above, EDID or CEA extension data stored in the EDID memory blocks 910 may be referred to as an EDID set. The EDID memory blocks 910 may be divided into predetermined number of segment units or segments (SPs). Each segment unit (e.g., SP 0, SP 1 . . . and SP K) may include, for example, two (2) blocks. Thus, a first segment SP 0 may include EDID memory block 0 and EDID memory block 1. A second segment SP 1 may include EDID memory block 2 and EDID memory block 3. In this manner, two blocks may be sequentially classified as a segment, and the Kth segment SP K may include EDID memory block N−1 and EDID memory block N, wherein 'N' is a natural number greater than 1 (e.g., N=255) and 'K' is a natural number less than N (e.g., K=127). Thus, in some embodiments, within one segment, EDID or CEA extension data may be stored in two blocks to form one EDID group.

Referring to FIG. 9A, when a value of the segment pointer is 0, the segment pointer may indicate the first segment (SP 0). In this case, EDID 0 and EDID 1 stored in the EDID memory block 0 and the EDID memory block 1 may be loaded into the cache memory 920.

Referring to FIG. 9B, once EDID 0 and EDID 1 have been read by the source device 50, the value of the segment pointer may be changed (e.g., incremented) from 0 to 1, such that the segment pointer points to the second segment (SP 1). In this case, EDID 2 and EDID 3 stored in the EDID memory block 2 and the EDID memory block 3 may be loaded into the cache memory 920.

Once EDID 2 and EDID 3 have been read by the source device 50, the value of the segment pointer may again be changed from 1 to 2, such that the segment pointer points to the third segment. In this case, two memory blocks are sequentially loaded, and as shown in FIG. 9C, when the value of the segment pointer is advanced to a value 'K', the segment pointer may point to a last (or K+1th) segment (SP K) and EDIDs stored in the EDID memory block N−1 and the EDID memory block N may be loaded into the cache memory 920.

From the foregoing, those skilled in the art will appreciate that HDMI systems according to the embodiments of the inventive concept will reduce overall manufacturing costs while also providing images in various resolutions to the user without necessarily redesigning the SoC in order to expand storage capacity of memory associated with the SoC.

Exemplary IDCC data structures will now be described—structures that may be used in relation to a method of determining whether a multi-EDID read operation is supported and a method of performing the multi-EDID read operation—with reference to FIGS. 10 and 11. Thus FIG. 10 is a conceptual diagram illustrating a source ID of an IDCC according to embodiments of the inventive concept and FIG. 11 is a conceptual diagram illustrating a sink ID of an IDCC according to embodiments of the inventive concept.

As previously noted, an IDCC protocol is a communication protocol introduced in HDMI 2.1a. The IDCC protocol covers a read transaction and a write transaction. An IDCC transaction may include an IDCC header, an IDCC payload, and an IDCC checksum. In this case, a source ID, a cable ID, or a sink ID may be determined according to a bit value set in a certain index (e.g., 0x02) of the IDCC header.

Referring to FIG. 10, an SI_PCA_n field is basically assigned to a 0-th bit position (See, e.g., "Bit 0" shown in FIG. 10) in a data structure of the source ID. The SI_PCA_n field may be used in relation to a connected cable assembly. When the source device 50 transmits the source ID having a cleared bit value (e.g., a bit value set to 0) to the sink device 100, the source device 50 may provide a maximum SRC, PCA current (Isrc, pca) to support power for cable assemblies (PCA).

To support the multi-EDID read operation, a source support field and an EDID read done field may be newly assigned to the data structure of the source ID. The source support field (see, e.g., "IS_Source_Support" of FIG. 10) may be the same as that described above with reference to FIGS. 7A, 7B, and 7C. The source support field may be assigned, for example, to a first bit position (see, e.g., "Bit 1" of FIG. 10) in the data structure of the source ID.

The EDID read done field (see, e.g., "IS_EDID_READ_DONE" of FIG. 10) may be a field indicating whether a read operation on the EDID group is complete. The EDID read done field may be assigned to, for example, a second bit position (see, e.g., "Bit 2" of FIG. 10) in the data structure of the source ID.

However, the positions to which the source support field and the EDID read done field may be assigned in the data structure of the source ID are not limited to those described in relation to FIG. 10.

Referring to FIG. 11, each bit position in the data structure of the existing sink ID may be a reserved field. To support the multi-EDID read operation, a sink support field, an EDID ready field, and an EDID finish field may be newly assigned to the data structure of the sink ID. The sink support field (see, e.g., "IS_Sink_Support" of FIG. 11), an EDID ready field (see, e.g., "IS_EDID_Ready" of FIG. 11), and EDID finish field (see, e.g., "IS_EDID_Finish" of FIG. 11) may be the same as those described above with reference to FIGS. 7A, 7B, and 7C. The sink support field may be assigned, for example, to $0^{-th}$ bit position (se, e.g., "Bit 0" of FIG. 11) in the data structure of the sink ID. The EDID ready field may be assigned, for example, to a first bit position (see, e.g., "Bit 1" of FIG. 11) in the data structure of the sink ID. The EDID finish field may be assigned, for example, to a second bit position (see, e.g., "Bit 2" of FIG. 11) in the data structure of the sink ID. However, the scope of the inventive concept is not limited to these examples. Rather, the sink support field, the EDID ready field, and the EDID finish field may be variously assigned to certain three bit positions in eight bit positions (see, e.g., "Bit 0" to "Bit 7" of FIG. 11).

Figure 12:
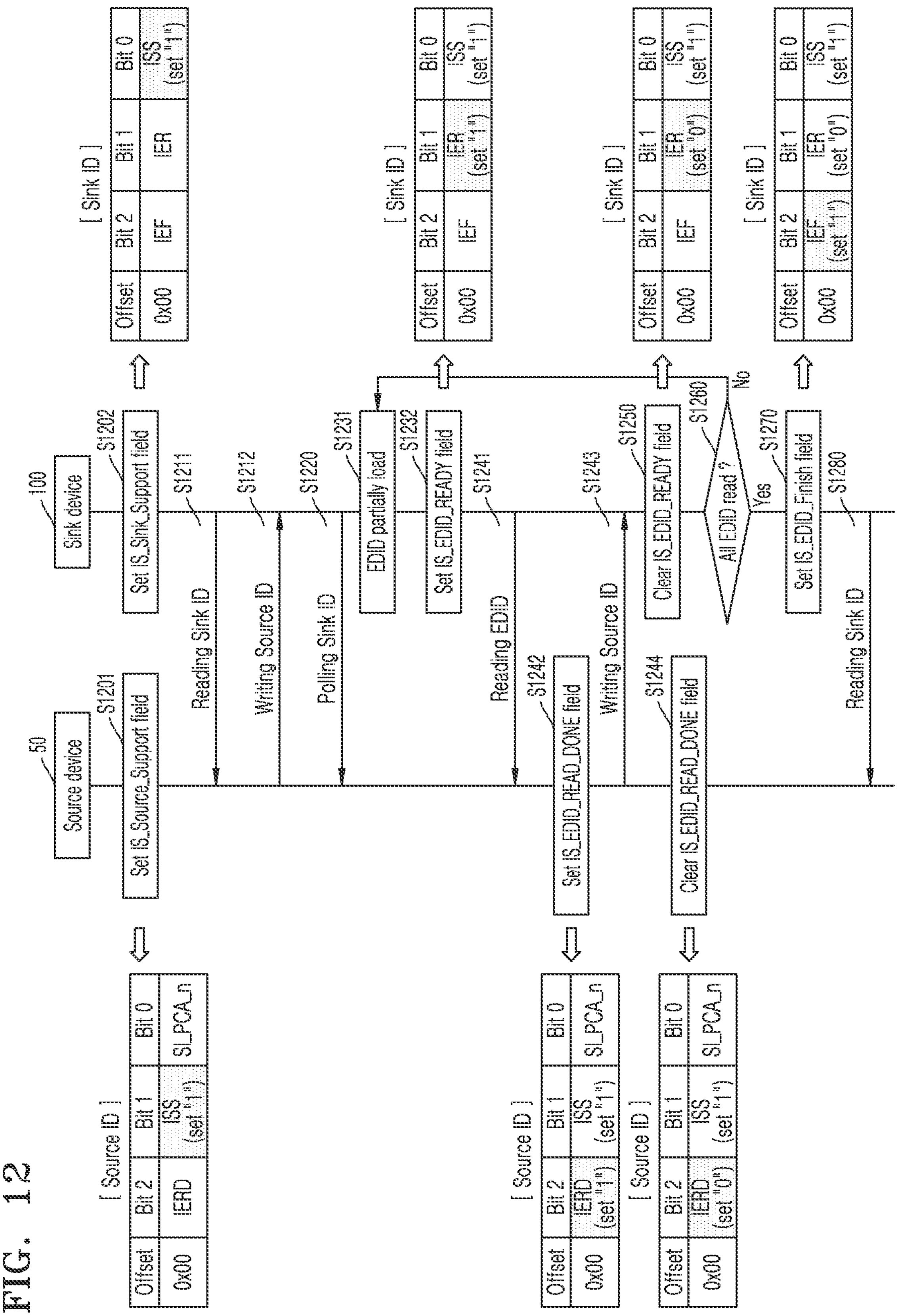
FIG. 12 is a composite flow diagram/flowchart diagram illustrating a multi-EDID read operation through IDCC according to embodiments of the inventive concept.

FIG. 12 is a composite flow diagram/flowchart illustrating a multi-EDID read operation through an IDCC according to embodiments of the inventive concept.

Referring to FIGS. 1, 8, 9A, 9B, 9C and 12, it is assumed that the size of the EDID set stored in the non-volatile memory 130 is greater than the size of the cache memory 120. It is further assumed that the source support field (see, e.g., "ISS" of FIG. 12) and the EDID read done field (see. e.g., "IERD" of FIG. 12) are assigned to a first bit position ("Bit 1" of FIG. 12) and a second bit position ("Bit 2" of FIG. 12) of the data structure of the source ID, respectively. It is still further assumed that the sink support field ("ISS" in FIG. 12), the EDID ready field ("IER" in FIG. 12), and the EDID finish field ("IEF" in FIG. 12) are assigned to a 0-th bit position ("Bit 0" in FIG. 12), a first bit position ("Bit 1" in FIG. 12), and a second bit position ("Bit 2" in FIG. 12) of the data structure of the sink ID, respectively. And finally, it is assumed that the first bit value set in the field is 1 and the second bit value set in the field is 0.

Under the foregoing assumptions, the source device 50 may set the bit value of the source support field of the source ID to 1 (S1201) (see, "ISS" (set "1") in FIG. 12) and sink device 100 may set the bit value of the sink support field of the sink ID to 1 (S1202) (see, e.g., "ISS" (set "1") in FIG. 12).

The source device 50 may then read a sink ID through an IDCC communication protocol (S1211). Here, the reading of the sink ID may include the sink device 100 transmitting the sink ID to the source device 50. The source device 50 may be used to determine whether the sink device 100 supports the multi-EDID read operation.

The source device 50 may write a source ID through the IDCC communication protocol (S1212). The writing of the source ID may include the source device 50 transmitting the source ID to the sink device 100. The sink device 100 (e.g., processor 121) may be used to determine whether the source device 50 supports the multi-EDID read operation by identifying a bit value of the source support field assigned to the source ID through the IDCC communication protocol.

If both the source device 50 and the sink device 100 support the multi-EDID read operation, the bit value of the source support field may be equal as 1 to the bit value of the sink support field.

Now, the source device 50 may continuously poll the sink ID through the IDCC communication protocol (S1220).

The sink device 100 may partially load the EDID (S1231). Partially loading the EDID may be performed in a manner similar to that described in relation to operation S830 previously described with reference to FIG. 8. Alternately, partially loading the EDID may be performed in a manner similar to that previously described with reference to FIGS. 9A, 9B, and 9C.

The sink device 100 may set a bit value in the EDID ready field of the sink ID (S1232). In some embodiments, the processor 121 may be used to set the bit value of the EDID ready field of the sink ID to 1. (See, e.g., "IER" (set "1") in FIG. 12). Method step S1232 may be substantially the same as the method step S840 previously described with reference to FIG. 8. Because the source device 50 continuously polls the sink ID, when the bit value of the EDID ready field of the sink ID is set to 1, the source device 50 may determine that the EDID has been loaded.

Under these conditions, the source device 50 may read the EDID (S1232 and S1241).

The source device 50 may set the value of the EDID read done field of the source ID to 1 (S1242). (See, e.g., "IERD" (set "1") in FIG. 12).

Then, the source device 50 may write the source ID through the IDCC communication protocol (S1243), and the sink device 100 may receive the source ID in which 1 is set in the EDID read done field.

The sink device 100 may then identify the source ID and clears the bit value of the EDID ready field of the sink ID from 1 to 0 (S1250). (See, e.g., "IER" (set "0")" in FIG. 12). In some embodiments, the processor 121 may set the bit value of the EDID ready field of the sink ID to 0 in response to the source ID.

The sink device 100 may determine whether EDID read operation(s) have been completed for all EDID stored in the non-volatile memory 130 (i.e., the EDID set) (S1260). If the multi-EDID read operation for all EDID is not complete (S1260=No)—that is, if there is a subsequent EDID group in the EDID set—method steps S1231 to S1260 may be repeatedly performed. However, when EDID read operation(s) for all EDID are complete (S1260=Yes)—that is, when the EDID set has been completely transmitted, the sink device 100 may set 1 in the EDID finish field of the sink ID (S1270). (See, e.g., "IEF" (set "1") in FIG. 12).

Then, the source device 50 may read the sink ID through the IDCC communication protocol (S1280). At this time, the source device 50 may determine that the multi-EDID read operation has been completed by identifying the EDID finish field of the sink ID.

From the foregoing, those skilled in the art will appreciate that HDMI systems according to embodiments of the inventive concept are capable of supporting multi-EDID read operation in order to provide images of various resolution to the user, thereby providing enhanced user convenience.

Figure 13:
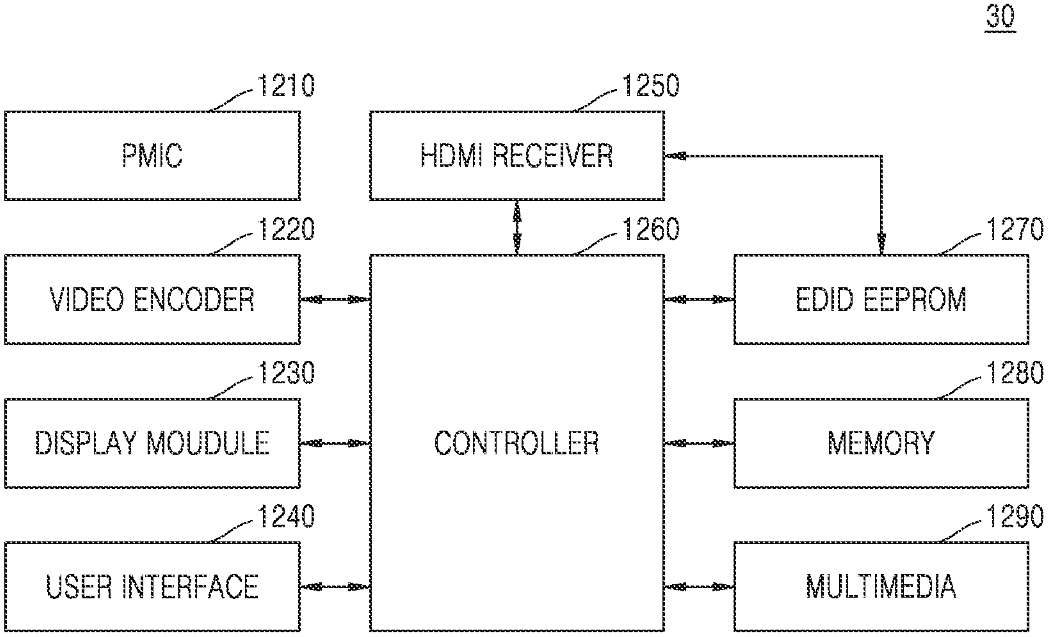
FIG. 13 is a block diagram illustrating an electronic device according to embodiments of the inventive concept.

FIG. 13 is a block diagram illustrating an electronic device 30 according to embodiments of the inventive concept.

Referring to FIG. 13, the electronic device 30 may correspond to the sink device 100 of FIG. 1. The electronic device 30 may include a power management integrated circuit (PMIC) 1210, a video encoder 1220, a display module 1230, a user interface 1240, an HDMI receiver 1250, a controller 1260, an EDID EEPROM 1270, a memory 1280, and multimedia 1290.

The PMIC 1210 receives power from the outside (e.g., a battery, a power supply, etc.) and supply operating power to each component (e.g., the video encoder 1220, the display module 1230, the user interface 1240, the HDMI receiver 1250, the controller 1260, the EDID EEPROM 1270, the memory 1280, and the multimedia 1290, etc.).

The video encoder 1220 may compress image data to be transmitted through the HDMI transmitter 2150.

The display module 1230 may display data related to various types of video, such as content data and user interface (UI) data, under the control of the controller 1260. The display module 1230 may include a display panel, a scan driver, a timing controller, a data driver, and the like. For example, the display module 1230 may be implemented as a liquid crystal display (LCD), a light emitting diode (LED) display, an organic LED (OLED) display, an active-matrix OLED (AMOLED) display, or a flexible display.

The user interface 1240 may be implemented as a remote controller, a voice receiving/recognizing device, a touch input sensing/receiving device, or the like.

The HDMI receiver 1250 corresponds to the HDMI receiver 210 shown in FIG. 2.

The controller 1260 may control the video encoder 1220, the display module 1230, the user interface 1240, the HDMI receiver 1250, the EDID EEPROM 1270, the memory 1280, and the multimedia 1290. The controller 1260 may be configured as a portion of the SoC 120 shown in FIG. 1.

Here, the EDID EEPROM 1270 denotes an EEPROM configured to store EDID.

The memory 1280 is a storage medium for storing data, and may store an operating system (OS), various programs, and/or various data. The memory 1280 may be, for example, DRAM, but is not limited thereto. For example, the memory 1280 may be a non-volatile memory device (e.g., a flash memory, a phase change RAM (PRAM), a magnetic RAM (MRAM), a resistive RAM (RRAM), or a ferroelectric RAM (FeRAM) device). The memory 1280 may correspond to the cache memory 122 of FIG. 1.

The multimedia 1290 may perform various types of multimedia reproduction.

Figure 14:
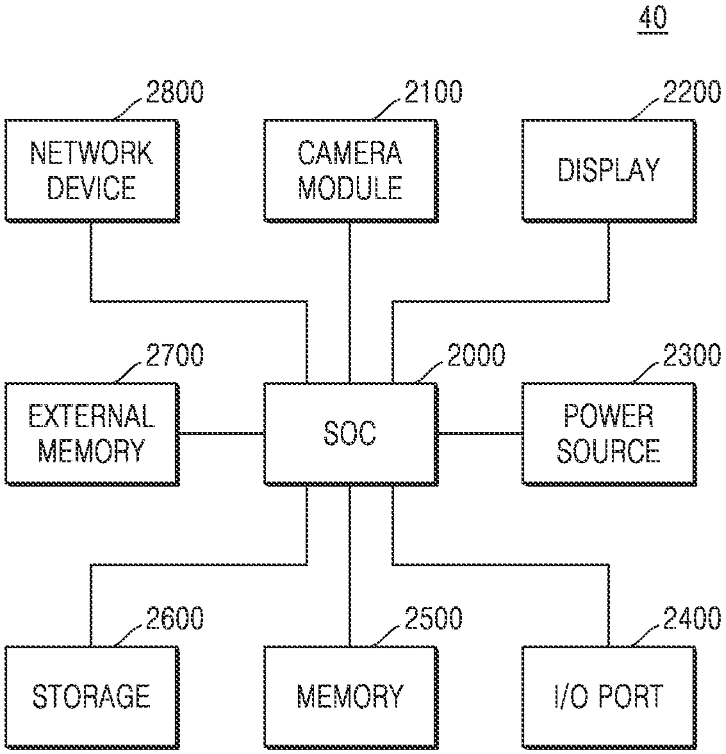
FIG. 14 is a block diagram illustrating an electronic device according to another embodiment.

FIG. 14 is a block diagram illustrating an electronic device 40 according to embodiments of the inventive concept.

Referring to FIG. 14, the electronic device 40 may be implemented as a personal computer (PC), a data server, or a portable electronic device.

The electronic device 40 may include an SoC 2000, a camera module 2100, a display 2200, a power source 2300, an input/output (I/O) port 2400, a memory 2500, a storage 2600, an external memory 2700, and a network device 2800.

The SoC 2000 may correspond to the SoC 120 of FIG. 1. The SoC 2000 may perform communication with the camera module 2100, the display 2200, the power source 2300, the I/O port 2400, the memory 2500, the storage 2600, the external memory 2700, and the network device 2800. The SoC 2000 may process signals to be input to the camera module 2100, the display 2200, the power source 2300, the I/O port 2400, the memory 2500, the storage 2600, the external memory 2700, and the network device 2800.

The camera module 2100 refers to a module capable of converting an optical image into an electrical image. Accordingly, the electrical image output from the camera module may be stored in the storage 2600, the memory 2500, or the external memory 2700. Also, the electrical image output from the camera module may be displayed on the display 2200.

The display 2200 may display 2200 data output from the storage 2600, the memory 2500, the I/O port 2400, the external memory 2700, or the network device 2800.

The power source 2300 may supply an operating voltage to at least one of the components. The power source 2300 may be controlled by a PMIC.

The I/O port 2400 may be a port capable of transmitting data to the electronic device 40 or data output from the electronic device 40 to an external device. For example, the I/O port 2400 may be a port for connecting a pointing device, such as a computer mouse, a port for connecting a printer, or a port for connecting a Universal Serial Bus (USB) drive.

The memory 2500 may be implemented as a volatile memory or a non-volatile memory. In some embodiments, a memory controller capable of controlling a data access operation, for example, a read operation, a write operation (or a program operation), or an erase operation for the memory 2500 may be integrated or embedded in the SoC 2000. According to other embodiments, the memory controller may be implemented between the SoC 2000 and the memory 2500.

The storage 2600 may be implemented as a hard disk drive or a solid state drive (SSD).

The external memory 2700 may be implemented as a secure digital (SD) card or a multimedia card (MMC). According to an embodiment, the external memory 2700 may include a subscriber identification module (SIM) card or a universal subscriber identity module (USIM) card.

The network device 2800 refers to a device capable of connecting the electronic device to a wired network or a wireless network.

Figure 15:
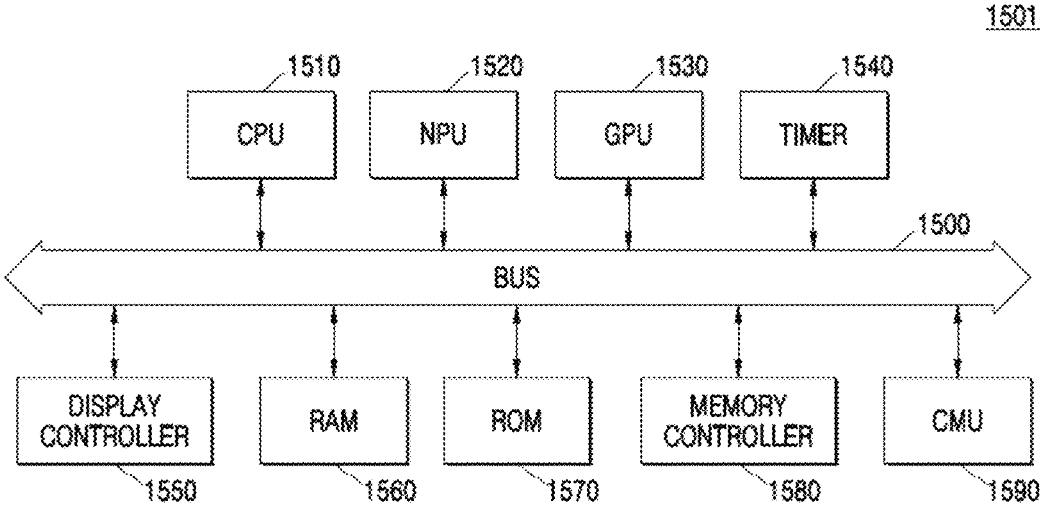
FIG. 15 is a block diagram further illustrating in one example the SoC.

FIG. 15 is a block diagram further illustrating in one example the SoC 1501.

Referring to FIG. 15, the SoC 1501 may include a central processing unit (CPU) 1510, a neural network processing unit (NPU) 1520, and a graphics processing unit (GPU) 1530, a timer 1540, a display controller 1550, RAM 1560, ROM 1570, a memory controller 1580, a clock management unit (CMU) 1590, and a bus 1500. The SoC 1501 may further include other components in addition to the illustrated components.

The CPU 1510 may also be referred to as a processor, and may process or execute programs and/or data stored in an external memory. For example, the CPU 1510 may process or execute programs and/or data in response to an operation clock signal output from the CMU 1590.

The CPU 1510 may be implemented as a multi-core processor. The multi-core processor includes a computing component having two or more independent substantial processors (called "cores"), each of which may read and execute program instructions. Programs and/or data stored in the ROM 1570, the RAM 1560, and/or the memory 1280 may be loaded into a memory (not shown) of the CPU 1510 as needed.

The NPU 1520 may efficiently process a large-scale operation using an artificial neural network. The NPU 1520 may perform deep learning by supporting a simultaneous matrix operation.

The GPU 1530 may convert data read from an external memory by the memory controller 1580 into a signal suitable for the display controller 1550.

The timer 1540 may output a count value indicating time based on the operation clock signal output from the CMU 1590.

The display controller 1550 may control an operation of an external display device.

The RAM 1560 may temporarily store programs, data, or instructions. For example, programs and/or data stored in the memory may be temporarily stored in the RAM 1560 according to the control of the CPU 1510 or a booting code stored in the ROM 1570. The RAM 1560 may be implemented as DRAM or static RAM (SRAM).

The ROM 1570 may store persistent programs and/or data. The ROM 1570 may be implemented as EPROM or EEPROM.

The memory controller 1580 may communicate with an external memory through an interface. The memory controller 1580 controls an overall operation of the external memory and controls data exchange between a host and the external memory. For example, the memory controller 1580 may write data to or read data from the external memory according to a request from the host. Here, the host may be a master device, such as the CPU 1510, the GPU 1530, or the display controller 1550.

The CMU 1590 generates an operating clock signal. The CMU 1590 may include a clock signal generating device, such as a phase locked loop (PLL), a delayed locked loop (DLL), or a crystal oscillator. The operating clock signal may be supplied to the GPU 1530. Of course, the operating clock signal may be supplied to another component (e.g., the CPU 1510 or the memory controller 1580). The CMU 1590 may change a frequency of the operating clock signal.

The CPU 1510, the NPU 1520, the GPU 1530, the timer 1540, the display controller 1550, the RAM 1560, the ROM 1570, the memory controller 1580, and the CMU 1590 may communicate with each other via the bus 1500.

While the inventive concept has been particularly shown and described with reference to embodiments thereof, it will be understood that various changes in form and details may be made therein without departing from the scope of the inventive concept as defined by the following claims.

What is claimed is:

1. An operating method for a high definition multimedia interface (HDMI) system including a source device and a sink device including a non-volatile memory and a cache memory, the operating method comprising:

determining whether the source device supports a multi-extended display identification data (EDID) read operation; and upon determining that the source device supports the multi-EDID read operation, sequentially transmitting an EDID set stored in the non-volatile memory to the source device in accordance with an EDID group defined by a size of the cache memory.

2. The operating method of claim 1, wherein the determining of whether the source device supports the multi-EDID read operation includes identifying a bit value of a source support field included in a structure of a status and control data channel (SCDC) by performing communication via the SCDC, or wherein the determining of whether the source device supports the multi-EDID read operation includes determining whether the source device supports the multi-EDID read operation through a display data channel (DDC).

3. The operating method of claim 2, wherein the structure of the SCDC further includes a sink support field indicating whether the sink device supports the multi-EDID read operation, and the bit value of the source support field is equal to a bit value of the sink support field.

4. The operating method of claim 2, wherein a size of the EDID set is greater than the size of the cache memory and the structure of the SCDC further includes an EDID ready field indicating whether the EDID group is loaded in the cache memory, and the sequentially transmitting of the EDID set to the source device includes:

setting a first bit value in the EDID ready field;

receiving a clear request for setting a second bit value different from the first bit value in the EDID ready field from the source device; and setting the first bit value in the EDID ready field if a subsequent EDID group of the EDID set is waiting to be transmitted after the second bit value is set in the EDID ready field.

5. The operating method of claim 4, wherein the structure of the SCDC further includes an EDID finish field indicating whether transmission of the EDID set to the source device is complete, and the sequentially transmitting of the EDID set to the source device further includes:

setting the first bit value in the EDID finish field after transmission of the EDID set is complete.

6. The operating method of claim 1, wherein the determining of whether the source device supports a multi-EDID read operation includes identifying a bit value of a source support field included in a source identification (ID) associated with the source device, through an ID communications channel (IDCC) for transmitting a sink ID associated with the sink device to the source device and receiving the source ID from the source device.

7. The operating method of claim 6, wherein the sink ID includes a sink support field indicating whether the sink device supports the multi-EDID read operation, and the bit value of the source support field is equal to a bit value of the sink support field.

8. The operating method of claim 6, wherein a size of the EDID set is greater than the size of the cache memory, the sink ID includes an EDID ready field indicating whether the EDID group is loaded in the cache memory, and the source ID includes an EDID read done field indicating whether an EDID read operation directed to the EDID group is complete, and the sequentially transmitting of the EDID set to the source device includes:

setting a first bit value in the EDID ready field;

receiving the source ID in which the first bit value is set in an EDID read done field;

setting a second bit value different from the first bit value in the EDID ready field in response to the source ID; and setting the first bit value in the EDID ready field if a subsequent EDID group in the EDID set is waiting to be transmitted after the second bit value is set in the EDID ready field.

9. The operating method of claim 8, wherein the sink ID further includes an EDID finish field indicating whether transmission of the EDID set to the source device is complete, and the sequentially transmitting of the EDID set to the source device further includes setting the first bit value in the EDID finish field after transmission of the EDID set is complete.

10. The operating method of claim 1, wherein the sequentially transmitting of the EDID set to the source device includes:

determining whether a size of the EDID set is greater than the size of the cache memory;

upon determining that the size of the EDID set is greater than the size of the cache memory, dividing the EDID set into at least two EDID groups, wherein each EDID group has a size equal to or less than the size of the cache memory;

sequentially loading the at least two EDID groups into the cache memory; and sequentially transmitting the at least two EDID groups loaded into the cache memory to the source device.

11. An electronic device that communicates with a source device through a high definition multimedia interface (HDMI), the electronic device comprising:

a non-volatile memory configured to store an extended display identification data (EDID) set;

a cache memory configured to temporarily store an EDID group selected from among the EDID set; and a processor configured to;

determine whether the source device supports a multi-EDID read operation;

upon determining that the source device supports the multi-EDID read operation, compare a size of the EDID set with a size of the cache memory;

upon determining that the size of the EDID set is greater than the size of the cache memory, select the EDID group from the EDID set in accordance with a transmission size corresponding to the size of the cache memory;

load the EDID group into the cache memory; and transmit the loaded EDID group to the source device.

12. The electronic device of claim 11, wherein the processor is further configured to determine whether the source device supports the multi-EDID read operation by identifying a bit value of a source support field included in a structure of a status and control data channel (SCDC) by performing communication through the SCDC; or determine whether the source device supports the multi-EDID read operation through a display data channel (DDC).

13. The electronic device of claim 12, wherein the structure of the SCDC further includes an EDID ready field indicating whether the EDID group is loaded into the cache memory, and upon loading the EDID group into the cache memory, the processor is further configured to set a first bit value in the EDID ready field.

14. The electronic device of claim 13, wherein after the first bit value is set in the EDID ready field and reading of EDID in the EDID group by the source device is complete, the processor is further configured to receive a clear request from the source device requesting the first bit value set in the EDID ready field be cleared with a second bit value, and set the second bit value in the EDID ready field.

15. The electronic device of claim 14, wherein, upon determining that a subsequent EDID group selected from among the EDID set is waiting to be transmitted after the second bit value has been set in the EDID ready field, the processor is further configured to load the subsequent EDID group into the cache memory, and set the first bit value in the EDID ready field.

16. An electronic device that communicates with a source device through a high definition multimedia interface (HDMI), the electronic device comprising:

a non-volatile memory configured to store an extended display identification data (EDID) set; and a system-on-chip (SOC) including a processor and a cache memory, wherein the processor is configured to determine whether the source device supports a multi-EDID read operation, and upon determining that the source device supports the multi-EDID read operation, sequentially transmit an EDID group selected from among the EDID set in accordance with a transmission size defined by a size of the cache memory.

17. The electronic device of claim 16, wherein the processor is further configured to determine whether the multi-EDID read operation is supported by identifying a bit value of a source support field included in a structure of a status and control data channel (SCDC) by performing communication through the SCDC; or determine whether the multi-EDID read operation is supported through a display data channel (DDC).

18. The electronic device of claim 16, wherein the processor is further configured to determine whether the multi-EDID read operation is supported by identifying a bit value of a source support field included in a source identification (ID) associated with the source device, through an ID communications channel (IDCC) for transmitting a sink ID associated with the electronic device to the source device and receiving the source ID from the source device.

19. The electronic device of claim 16, wherein during the sequentially transmitting of the EDID set the processor is further configured to:

determine whether a size of the EDID set is greater than the size of the cache memory;

upon determining that the size of the EDID set is greater than the size of the cache memory, divide the EDID set into at least two EDID groups, wherein each EDID group has a size equal to or less than the size of the cache memory;

sequentially load the at least two EDID groups into the cache memory; and sequentially transmit the at least two EDID groups loaded into the cache memory to the source device.

20. The electronic device of claim 16, wherein the electronic device further comprises an HDMI receiver, and the source device comprises an HDMI transmitter.

* * * * *